US010482490B2

(12) United States Patent
Capel et al.

(10) Patent No.: US 10,482,490 B2
(45) Date of Patent: Nov. 19, 2019

(54) BEHAVIORAL TRACKING SYSTEM AND METHOD IN SUPPORT OF HIGH-ENGAGEMENT COMMUNICATIONS

(71) Applicant: Sailthru, Inc., New York, NY (US)

(72) Inventors: Neil James Capel, New York, NY (US); Ian Bradford White, Brooklyn, NY (US)

(73) Assignee: SAILTHRU, INC., New York, NY (US)

( * ) Notice: Subject to any disclaimer, the term of this patent is extended or adjusted under 35 U.S.C. 154(b) by 758 days.

(21) Appl. No.: 14/683,114

(22) Filed: Apr. 9, 2015

(65) Prior Publication Data

US 2015/0294349 A1 Oct. 15, 2015

Related U.S. Application Data

(60) Provisional application No. 61/977,388, filed on Apr. 9, 2014.

(51) Int. Cl.
*G06Q 30/02* (2012.01)
(52) U.S. Cl.
CPC ..... *G06Q 30/0244* (2013.01); *G06Q 30/0267* (2013.01)
(58) Field of Classification Search
USPC .......................................................... 705/14
See application file for complete search history.

(56) References Cited

U.S. PATENT DOCUMENTS

| 7,072,947 | B1 | 7/2006 | Knox et al. |
|---|---|---|---|
| 8,019,744 | B1 | 9/2011 | Roizen |
| 8,504,411 | B1 | 8/2013 | Subasic |
| 9,430,738 | B1 | 8/2016 | Hui |
| 2001/0034775 | A1 | 10/2001 | Minowa |
| 2001/0037391 | A1 | 11/2001 | West |
| 2001/0047294 | A1 | 11/2001 | Rothschild |
| 2001/0049688 | A1 | 12/2001 | Fratkina |
| 2001/0056460 | A1 | 12/2001 | Sahota et al. |
| 2002/0078191 | A1 | 6/2002 | Lorenz |
| 2007/0185858 | A1 | 8/2007 | Lu |
| 2008/0010273 | A1 | 1/2008 | Frank |
| 2008/0010605 | A1 | 1/2008 | Frank |
| 2008/0172291 | A1* | 7/2008 | Hurowitz ............... G06Q 30/02 705/14.1 |

(Continued)

*Primary Examiner* — John Van Bramer
*Assistant Examiner* — Darnell A Pouncil
(74) *Attorney, Agent, or Firm* — Leason Ellis LLP

(57) ABSTRACT

Systems and methods provide targeted communications for each of a plurality of respective recipients. A database includes user information, customer information, template information, content feed information and advertising information. A template instruction is processed to select a template for generating the targeted communication, which is customized with at least some of the content feed. The targeted communication is scheduled for delivery, and at least some advertising information is selected to be included, as a function of geo-location information associated with at least one of the plurality of recipients. At least some advertising information is processed to format the advertising information with the targeted communication based at least on at least one instruction received from the registered user. The targeted communication is generated and transmitted to each of the plurality of recipients.

15 Claims, 23 Drawing Sheets

(56) References Cited

U.S. PATENT DOCUMENTS

| | | |
|---|---|---|
| 2008/0201310 A1 | 8/2008 | Fitzpatrick et al. |
| 2008/0221892 A1 | 9/2008 | Nathan |
| 2009/0006195 A1 | 1/2009 | Rosen |
| 2009/0018917 A1 | 1/2009 | Chapman et al. |
| 2009/0150920 A1 | 6/2009 | Jones |
| 2009/0281923 A1 | 11/2009 | Selinger |
| 2010/0131835 A1 | 5/2010 | Kumar |
| 2011/0113032 A1 | 5/2011 | Boscolo |
| 2011/0208822 A1* | 8/2011 | Rathod ............. G06F 17/30867 709/206 |
| 2011/0238525 A1 | 9/2011 | Linden et al. |
| 2012/0066261 A1 | 3/2012 | Saka |
| 2012/0078813 A1 | 3/2012 | Rose |
| 2012/0095976 A1 | 4/2012 | Hebenthal |
| 2012/0278321 A1 | 11/2012 | Traub |
| 2013/0013644 A1 | 1/2013 | Sathish |
| 2013/0124525 A1 | 5/2013 | Anderson |
| 2013/0254010 A1 | 9/2013 | Letca et al. |
| 2013/0326009 A1 | 12/2013 | Morgan et al. |
| 2014/0040275 A1 | 2/2014 | Dang |
| 2014/0108386 A1 | 4/2014 | Andler |
| 2014/0149510 A1 | 5/2014 | Sundaresan |
| 2014/0278967 A1 | 9/2014 | Pal |
| 2015/0302030 A1 | 10/2015 | Vaccari |
| 2016/0004667 A1 | 1/2016 | Chakerian |
| 2016/0004764 A1 | 1/2016 | Chakerian |
| 2016/0034525 A1 | 2/2016 | Neels |
| 2017/0199757 A1 | 7/2017 | Fountain |
| 2017/0220943 A1 | 8/2017 | Duncan et al. |

\* cited by examiner

Fig. 11

BEHAVIORAL TRACKING SYSTEM AND METHOD IN SUPPORT OF HIGH-ENGAGEMENT COMMUNICATIONS

CROSS-REFERENCE TO RELATED APPLICATIONS

This application is based on and claims priority to U.S. Provisional Patent Application Ser. No. 61/977,388, filed on Apr. 9, 2014, the entire contents of which are respectively incorporated by reference as if set forth in its entirety herein.

FIELD

The present application relates, generally, to networks and, more particularly, to providing operability for engaging consumers.

BACKGROUND OF THE INVENTION

Various providers of goods and services (e.g., merchants) continue to seek new ways to engage customers. Push notifications, for example, enables a merchant to send a message to a group of users at some specific time, for example to the users' mobile devices. When received, the devices show an alert, and the next time the users activate their devices, the notification is visible. The users then decide the next step.

Unfortunately, it is recognized that too often users simply take no further action and/or forget about the message they just received.

SUMMARY OF THE INVENTION

In accordance with one or more implementations of the present application, a system and method provide targeted communications to each of a plurality of respective recipients. At least one database is stored on non-transitory processor readable media and is accessible to at least one processor. The at least one database includes electronic user information associated with a plurality of registered users, electronic customer information associated with each of a plurality of respective customers of at least one of the registered users, electronic template information representing a plurality of templates that are useable for generating the targeted communications, and electronic content feed information representing information to be dynamically provided with the targeted communications. Moreover, a template module is provided that configures the at least one processor to process at least one template instruction received from a computing device operated by a registered user, to select one of the plurality of the templates for generating the targeted communication, to identify the plurality of respective recipients and to customize the one of the plurality of templates with at least some of the content feed respectively selected for the respective recipients. The template module further configures the at least one processor to process at least one instruction received from the computing device operated by the registered user to track activity by at least one of the recipients.

Further, an external data platform module is provided that configures the at least one processor to provide at least one user interface to an external data platform. The at least one user interface provides information associated with at least some of the tracked activity and to receive input from a computing device associated with at least one of the respective recipients in connection with the information associated with at least some of the tracked activity.

These and other features and advantages of the present application will become apparent from the following description that refers to the accompanying drawings.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 11 illustrates an example data entry display screen that includes options for defining a recurring campaign;

DETAILED DESCRIPTION

The present application provides a computerized platform that includes one or more modules for users to develop and manage communications, such as email campaigns for their customers. Moreover, the present application includes one or more modules that manage the tracking of user activity, such as click-rates of one or more links that are included in email messages. For example, graphical user interfaces are provided for management of email campaigns, email lists of subscribers for mass mailings, and formatting and transmitting tracking images that are used for tracking rates at which users open and/or interact with email messages.

In one or more implementations, interest-based behavioral personalization is provided in connection with email campaigns. For example, content from one or more Internet websites can be provided automatically into an email campaign, alerts can be defined that operate substantially in real time to filter for specific content, transactional emails using Simple Mail Transport Protocol ("SMTP") can be transmitted, and geo-located mailing lists or snapshot reports for email campaigns can be provided.

As shown and/or described herein, one or more modules of the present application provide interfaces and options for users to send email messages, including in connection with transaction email messages and email campaigns to large numbers and groups of people rapidly. For example, email campaigns can be provided for newsletters, massive notifications, breaking news, and so on. Moreover, the present application provides options for users to provide customization for their web sites, including as a function of the email campaigns.

Figure 1:
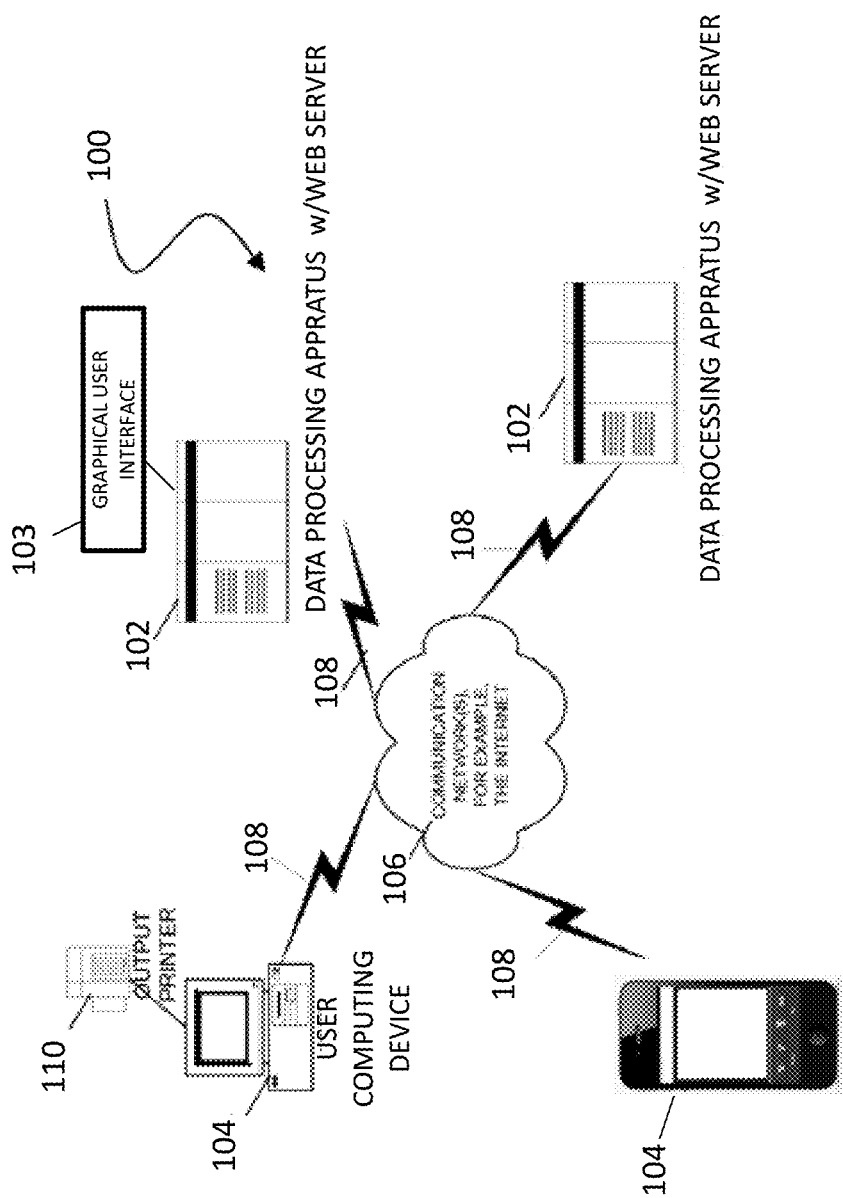
FIG. 1 shows an example hardware arrangement of computing devices arranged to send and receive information in accordance with an implementation.

Referring now to the drawings in which like reference numerals refer to like elements, there is shown in FIG. 1 a diagram of an example hardware arrangement that operates for providing the systems and methods disclosed herein, and designated generally as system 100. The example system 100 is preferably comprised of one or more data processing apparatus 102 coupled to one or more user computing devices 104 across communication network 106. User computing devices 104 may include, for example, mobile computing devices such as tablet computing devices, smart-phones, personal digital assistants or the like. Further, printed output is provided, for example, via output printers 110.

Data processing apparatus 102 preferably includes all necessary databases for the present invention, including image files, metadata and other information relating to artwork, artists, and galleries. However, it is contemplated that data processing apparatus 102 can access any required databases via communication network 106 or any other communication network to which data processing apparatus 102 has access. Data processing apparatus 102 can communicate devices comprising databases using any known communication method, including a direct serial, parallel, USB interface, or via a local or wide area network. Database(s) that are accessible by data processing apparatus 102 can contain and/or maintain various data items and elements that are utilized throughout the various operations of the system (100). For example, the database(s) can contain include user information including account information concerning the user's various accounts third-party content and service providers. The database(s) can also include user preferences concerning operation of the system 100 and other settings related to the third-party content and service providers. By way of further example, the database(s) can also include a library of digital media content.

User computing devices 104 communicate with data processing apparatus 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers to display the received data on display devices incorporated therewith. By way of example, user computing device 104 may be personal computers such as Intel Pentium-class computers or Apple Macintosh computers, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106. Of course, one skilled in the art will recognize that wireless devices can communicate with data processing apparatus 102 using wireless data communication connections (e.g., Wi-Fi).

System 100 preferably includes software that provides functionality described in greater detail herein, and preferably resides on one or more data processing apparatus 102 and/or user computing devices 104. One of the functions performed by data processing apparatus 102 is that of operating as a web server and/or a web site host. Data processing apparatus 102 typically communicate with communication network 106 across a permanent i.e., unswitched data connection 108. Permanent connectivity ensures that access to data processing apparatus 102 is always available.

Figure 2:
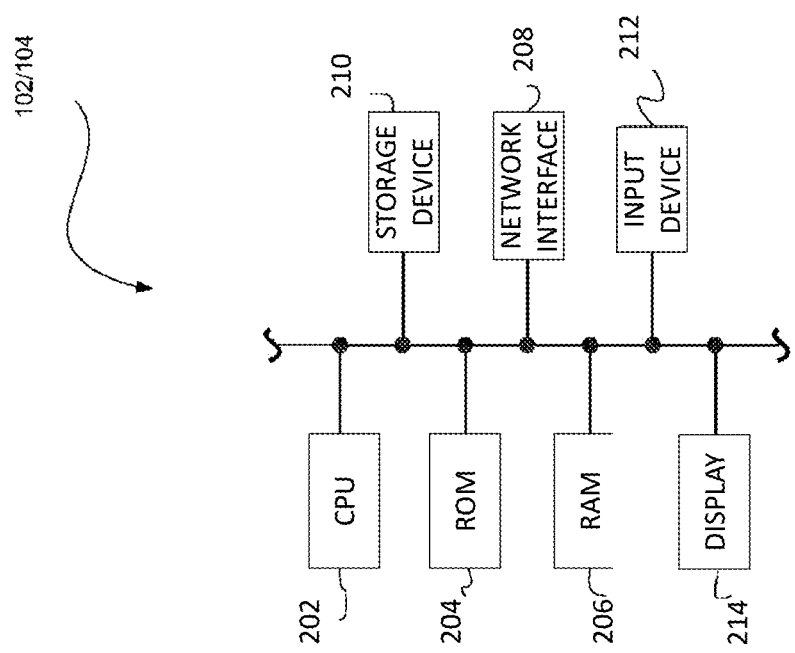
FIG. 2 is a block diagram that illustrates functional elements of a computing device in accordance with an embodiment.

As shown in FIG. 2 the functional elements of each data processing apparatus 102 or computing device 104, and preferably include one or more processors 202 used to execute software code in order to control the operation of data processing apparatus 102, read only memory (ROM) 204, random access memory (RAM) 206 or any other suitable volatile or non-volatile computer readable storage medium, which can be fixed or removable. FIG. 2 also includes one or more network interfaces 208 to transmit and receive data to and from other computing devices across a communication network. The network interface 208 can be any interface that enables communication between the any of the devices (e.g., 102, 104, 110) shown in FIG. 1 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the devices and/or communication networks, such as private networks and the Internet. Such connections can include a wired connection or a wireless connection (e.g., using the IEEE 802.11 standard known in the relevant art) though it should be understood that network interface 208 can be practically any interface that enables communication to/from the processor 202.

Continuing with reference to FIG. 2, storage device(s) 210 can be included such as a hard disk drive, floppy disk drive, tape drive, CD-ROM or DVD drive, flash memory, rewritable optical disk, rewritable magnetic tape, or some combination of the above for storing program code, databases and application code. In certain implementations, memory 204, 206 and/or storage device(s) 210 are accessible by the processor 202, thereby enabling the processor 202 to receive and execute instructions stored on the memory 204, 206 and/or on the storage 210. Further, elements include one or more input devices 212 such as a keyboard, mouse, track ball and the like, and a display 214. The display 214 can include a screen or any other such presentation device that enables the system to instruct or otherwise provide feedback to the user regarding the operation of the system (100). By way of example, display 214 can be a digital display such as an LCD display, a CRT, an LED display, or other such 2-dimensional display as would be understood by those skilled in the art. By way of further example, a user interface and the display 214 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So when the touch screen is touched, interface communicates this change to processor, and settings can be changed or user entered information can be captured and stored in the memory.

One or more software modules can be encoded in the storage device(s) 210 and/or in the memory 204, 206. The software modules can comprise one or more software programs or applications having computer program code or a set of instructions executed in the processor 202. Such computer program code or instructions for carrying out operations or aspects of the systems and methods disclosed herein can be written in any combination of one or more programming languages, as would be understood by those skilled in the art. The program code can execute entirely on one computing device (e.g., data processing apparatus 102) as a stand-alone software package, partly on one device and partly on one or more remote computing devices, such as, a user computing device 104, or entirely on such remote computing devices. In the latter scenario and as noted herein, the various computing devices can be connected to the data processing apparatus 102 through any type of wired or wireless network, including a local area network (LAN) or a wide area network (WAN), or the connection can be made to an external computer (for example, through the Internet using an Internet Service Provider). It should be understood that in some illustrative embodiments, one or more of the software modules can be downloaded over a network from another device or system via the network interface 208. For instance, program code stored in a computer readable storage device in a server can be downloaded over a network from the server to the storage 210.

It is to be appreciated that several of the logical operations described herein are implemented (1) as a sequence of computer implemented acts or program modules running on the various devices of the system 100 and/or (2) as interconnected machine logic circuits or circuit modules within the system (100). The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Thus, the various components of data processing apparatus 102 need not be physically contained within the same chassis or even located in a single location. For example, as explained above with respect to databases which can reside on storage device 210, storage device 210 may be located at a site which is remote from the remaining elements of data processing apparatus 102, and may even be connected to CPU 202 across communication network 106 via network interface 208.

The nature of the present application is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, IOS, ANDROID, TORR and various web application development environments.

As used herein, references to displaying data on user computing device 104 refer to the process of communicating data to the computing device across communication network 106 and processing the data such that the data can be viewed on the user computing device 104 display 214 using a web browser or the like. The display screens on user computing device 104 present areas within control allocation system 100 such that a user can proceed from area to area within the control allocation system 100 by selecting a desired link. Therefore, each user's experience with control allocation system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of control allocation system 100.

Figure 3:
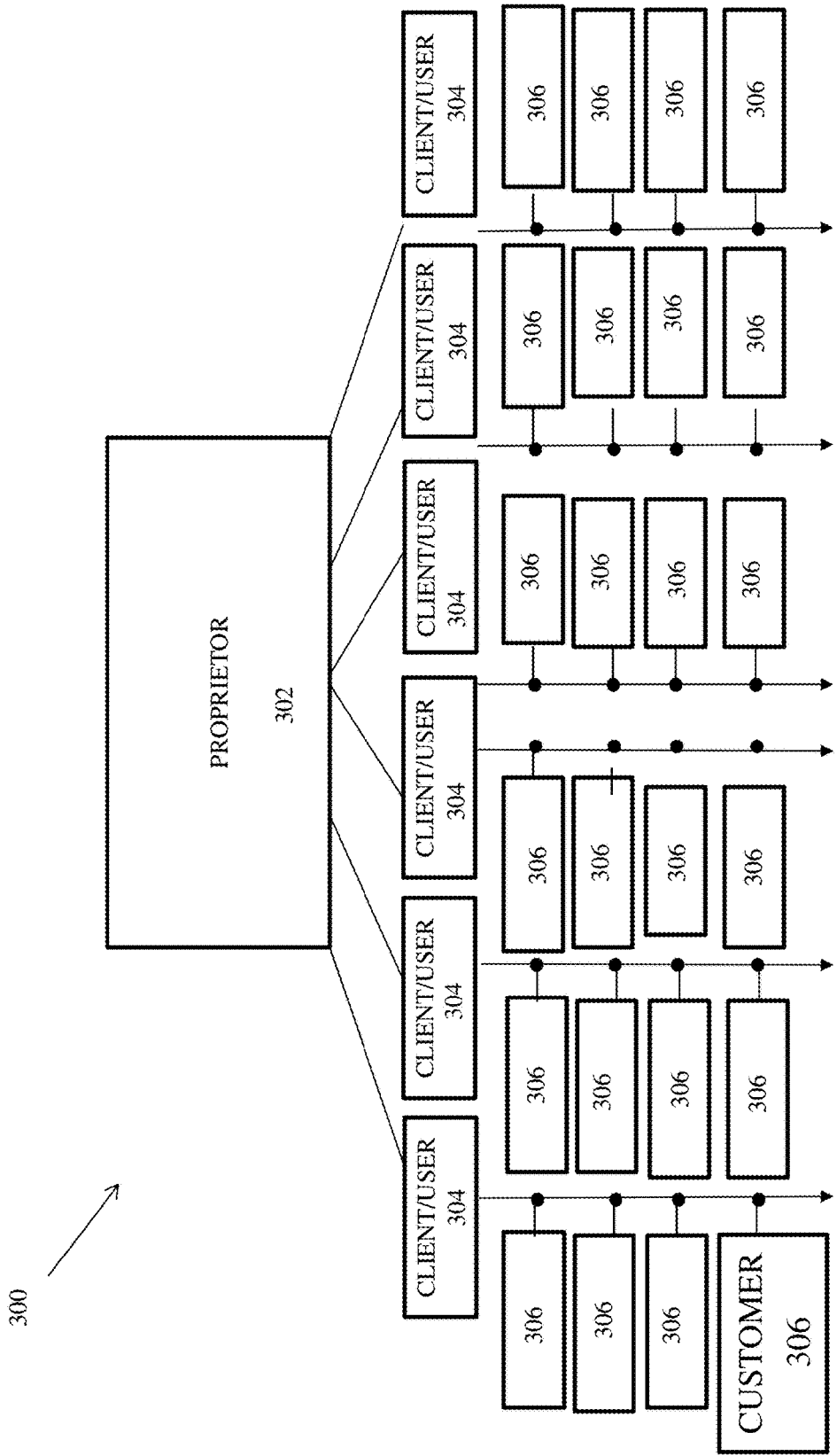
FIG. 3 is a block diagram illustrating a network of parties in accordance with one or more implementations of the present application.

FIG. 3 is a block diagram illustrating a network of parties 300 in accordance with one or more implementations of the present application. As shown in FIG. 3, plurality of clients 304 of proprietor 302 are communicatively coupled together, such as via data processing apparatus 102 and user computing devices 104 and communication network 106. Clients/Users 304 avail themselves of functionality proprietor 302 offers via data processing apparatus 102 substantially as shown and/or described herein. Such functionality is usable by clients/users 304 to service their respective customers 306. Thus and as shown in FIG. 3, a plurality of customers 306 are respectively serviced by clients/users 304 of proprietor 302, including to receive email messages, newsletters, alerts or other content that can be customized for each respective customer 306. In this way, the teachings herein provide for propagation of technology and functionality across many different industries and technologies.

Figure 4:
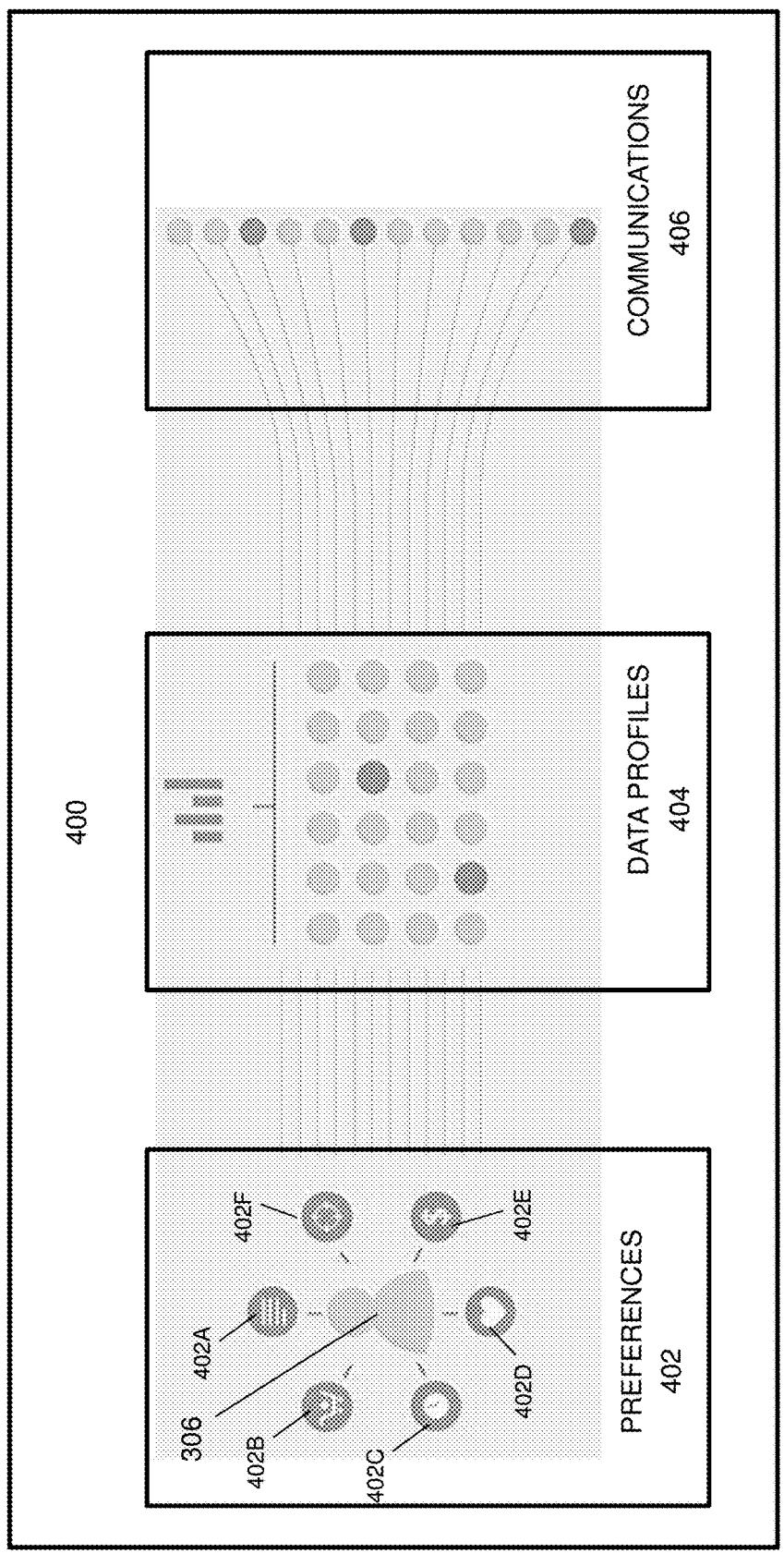
FIG. 4 is a block diagram illustrating a high level representation of an implementation of the present application in connection with a single customer.

FIG. 4 is a block diagram illustrating a high level representation 400 of information and functionality in accordance with an example implementation of the present application. As shown in FIG. 4, preferences 402 of a respective customer 306 are used by clients/users 304 in formulation of data profiles 404. For example, customer lists 402A, customer shopping preferences 402B, customer time preferences 402C, personal preferences and/or favorites 402D, financial preferences 402E and geographic preferences 402F are illustrated in FIG. 4. Additionally, data profiles 404 of customers 306 that can be based on and/or supplemented using preferences 402 are usable to generate and transmit communications 406, substantially as shown and/or described herein.

Figure 5:
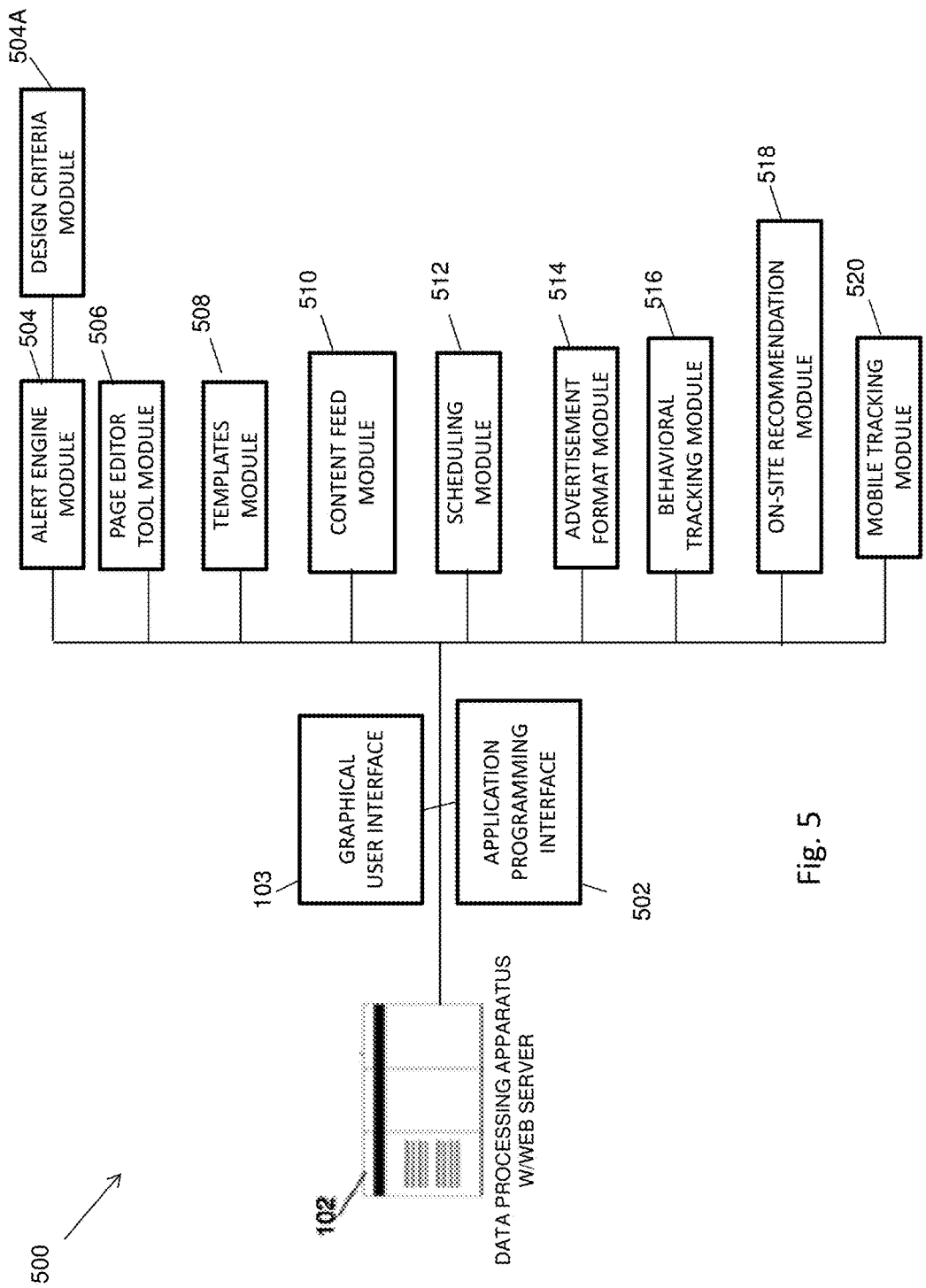
FIG. 5 is a block diagram that illustrates example features and functionality provided in accordance with one or more implementations of present application.

FIG. 5 is a block diagram 500 that illustrates example hardware and software features and functionality provided in accordance with one or more implementations of present application. Included in the arrangement shown in FIG. 5, various modules are programmatically tied to graphical user interface 103 and/or API 502, which are supported by data processing apparatus 102. A non-limiting list of modules provided via graphical user interface 103 and/or application programming interface (API) 502 and illustrated in FIG. 5 include: alert engine module 504, page editor tool module 506, templates module 508, content feed module 510, scheduling module 512, advertisement format module 514 behavioral tracking module 516, on-site recommender module 518 and mobile device tracking module 520.

Figure 6:
FIG. 6 illustrates example display screens that respectively provide content to two customers, in accordance with an implementation of the present application.

In one or more implementations, the present application supports APIs 502 for various functionality that enable users 304 to provide customized content to customers 306. Particular selections of customized content may be made in accordance with historical activity and/or behavior of respective customers 306. For example, one customer 306 (e.g., Sarah) typically reads content (e.g., articles) associated with politics, while another customer 306 (e.g., John) typically cares more about sports. Accordingly, content about breaking political updates is selected for and delivered to Sarah and content about a preferred sports team is selected for and delivered to John. An example implementation showing content respectively provided to two customers 306 is illustrated in example display screens 600A and 600B, shown in FIG. 6.

One or more APIs 502 may be made available by download, such as using user computing device 104, and may further be tailored for use for user's 304 respective computing device's 104 programming language and/or operating system. One or more pre-built libraries may be utilized by users' 304 respective computing devices 104, which support customization, for example, with relatively simple programming code provided by users 304. In one or more implementations, users 304 may write code inside an application to cause one or more desired actions to be performed. In some cases, this may be as little as one line of code. With functional automation in place, users 304 are able to spend less time in a web-based interface to define one or more operations associated with an email campaign, which improves the experience for customer 306.

In one or more implementations, one or more APIs 502 include a simple REST-based service. Various functionality provided via APIs 502 can include sending email messages to customers 306, enabling a customer 306 to sign up for subscription services, and scheduling email campaigns to multiple recipients. Other functionality can include defining dates for user subscriptions to email lists, performing background processing tasks, such as subscriber list imports, identify bulk updates of subscriber information, identify export details of subscriber information, and identify status information of an in-progress job.

In addition, cascading style sheets (CSS), as known in the arts, can be used in connection with at least some of the functionality shown and described. Of course, one skilled in the art will recognize that use of CSS is not required in all situations, and the present application support the creation and editing of various custom pages (such as "opt-out" pages) using various suitable technology (e.g., active server pages, HTML, applets, servlets, or the like). The present application further supports flexible implementations, such as to provide for "op-downs" which provides recipients with an option, in appropriate contexts, to receive email less often or less regularly (such as from daily to monthly).

Furthermore and in one or more implementations, a tracking object, such as a transparent graphic image file ("GIF") can be provided that is used to track email activity associated with recipients. Tracking objects are effective for recipients who are reading email with images turned on. Tracking objects may be included in email templates and mailing campaigns, and allow users to gather information about recipients. Such information includes, but is not limited to, identifying users who do not open (click on) email messages, identifying those users who do open email messages, identifying the time of day that email messages are opened and identifying geo-location information associated with a customer 306 who reads an email message. In one or more implementations, a tracking object that is provided with an email message is formatted as a logo or other image. The tracking object may be uploaded by user 304 operating a user operating computing device 104 to data processing apparatus 102 via graphical user interface 103. Customers 304 may implement functionality associated with a tracking object, for example, by including a tag, such as an HTML tag (e.g. {beacon}) that, when selected by a recipient of an email message (e.g., customer 306), links the recipient's computing device to an Internet website of the user 304 associated with computing device 104. In alternative embodiments, users 304 may include different tags, such as image tags, to change performance associated with a recipient selecting a tracking object image.

In accordance with one or more implementations of the present application, alert engine module 504 can be configured to provide message alerts, which may be formatted as transactional email messages, to notify customers 306 of new and/or updated content on a website associated with a client/user 304 of user computing device 104. The alert(s) may be provided when a condition matches one or more predefined criteria. For example, a user may want to be notified whenever certain types of products or certain price ranges are released on an e-commerce site associated with a client 304. In another example, a customer 306 may want to be notified when news articles about certain topics are released. In support of alerts, the alert module 504 can be configured to track user preferences and send notifications in accordance with the preferences. Alerts can be provided in basic types, including, for example, real-time alerts and summary alerts. Real-time alerts contain notifications about a single piece of content, and are sent immediately after a piece of content is published. Summary alerts contain information including content published over a specified time period, and are sent at periodic times, such as daily or weekly.

Alert engine module 504 can be provided via user interface 103 and that includes one or more controls (e.g., graphical screen controls), that when selected results in instructions executed by a processor 202 to enable clients 304 to manage alerts. In accordance with one or more implementations, the alert engine module 504 includes a plurality of modules, such as for defining alerts, creating templates, integrating preference information and transmission of alerts.

In one or more implementations, alert module 504 can include a design criteria module 504A that includes one or more controls for users 304 to define one or more variables, such as filters that are used to select and transmit alerts. In one or more implementations, users 304 can define relatively simple filters that match one or more values against tags, metadata or other coded criteria. For example, user 304 is associated with a clothing retail website wants to filter alerts by price (a number), brand (a string), and tags (an array of strings). When criteria meeting these filters are met, the respective customers 306 of user 304 are alerted.

In one or more implementations, page editor tool module 506 (FIG. 5) can be provided and that includes one or more controls that enable users 304 to build custom Internet webpages for the user's 304 website. For example, page editor tool module 506 can include a tool within GUI 103 that is provided for users 304 to create sign-up pages for customers 306 to become email list subscribers. Users 304 can define one or more mailing lists, manage profile data (e.g., name, telephone number, postal code, email address or the like), as well as to define a frequency for receiving email (weekly, monthly, annually, etc.) or options for enabling customers 306 to opt in and out of lists.

Figure 7:
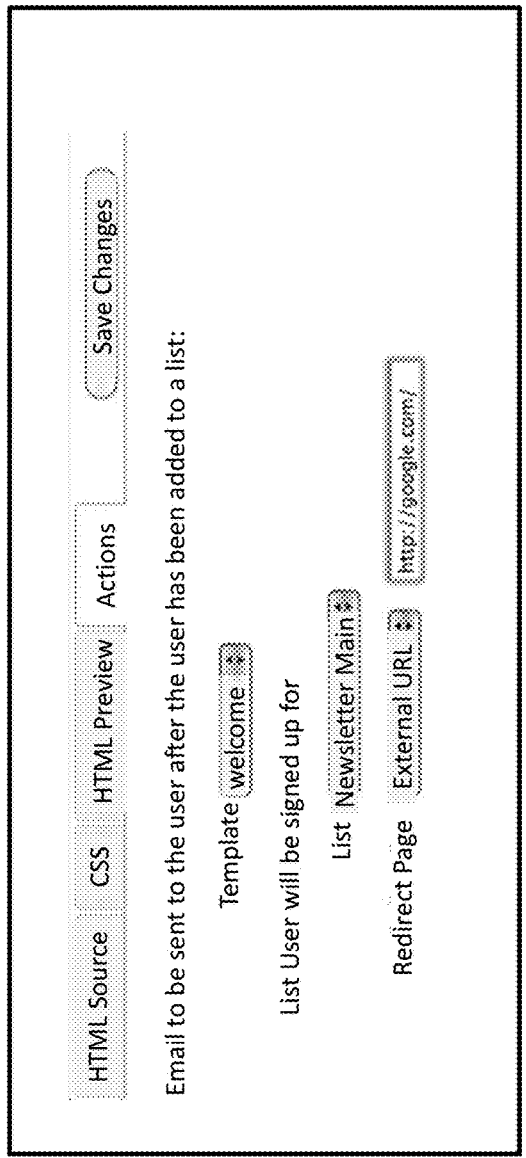
FIG. 7 illustrates an example display screen associated with an embodiment of the present application in connection with page editor options.

An example display screen 700 that is configured for users 304 define an email campaign in accordance with an example implementation of the present application, is shown in FIG. 7. Display screen 700 includes an "ACTIONS TAB" and includes graphical screen controls that are provided, for example, for users 304 to add recipients to one or more lists, to define variables to collect data about recipients, including personal information, behavioral information or the like (not shown). Other options can be included for users to customize, such as for customized error messages in the event of invalid data entered by a user.

Continuing with reference to FIG. 7, other options can be provided that allow a user to set up which email, if any, is sent automatically to a subscriber, once the subscriber has signed up to receive email. Other features include options for allowing a user to select a mailing list the subscriber will become a part of, and set up a redirect page. Options may be provided to track as the number of subscribers to a list grows. As shown in FIG. 7, "Redirect Page" section includes an option to identify a web page, such as that was defined using the page editor tool (e.g., a "thank you" page) or an external uniform resource locator (URL) (such as a web page of user 304).

In one or more implementations, templates module 508 (FIG. 5) can enable users 304 to define templates for, for example, alerts. For example, templates module 508 can generate alerts in accordance with one or more variables that users 304 define. For example, when a user 304 decides to lower the price of an item, an alert that was previously defined as a function of templates module 508 to send to customers 306 a notification when the price lowers is sent. Templates can be supported, for example, for real-time alerts and for summary alerts. In addition to alerts, users 304 can use a variety of different templates for various purposes, such as email campaigns.

Templates module 508 can further include an alert management build module that enables users 304 to customize preferences pages and define corresponding alert settings according to respective customer preferences. For example, alerts can be defined for any PRADA item that is on sale for $300 or less. In response to such condition, one or more calls to one or more APIs 502 can be executed to effect the respective alert to be made.

Further, template module 508 can include an integrated content pushing module that enables users 304 to push content to customers 306. The present application supports functionality to enable a real-time alert to be sent whenever particular content is published, such as on user 304 website. Content may also be automatically stored, for example, on data processing apparatus 102 for generating and providing summary alerts. In one or more implementations, users 304 utilize a content management system by executing a call to a respective API, whenever a piece of content is first published. In one or more contexts content is formatted to include a title, URL, and date, and further may contain any number of tags and a number of custom variables. If a user 304 does not specify a date, a current timestamp may be used in its place.

Examples of details and functionality, included that are associated with modules 504-514 are further shown and described with reference to FIGS. 8A-8D. FIGS. 8A-8D include data entry display screens associated with defining an ad campaign, including via templates, page editor editors, and scheduling email campaigns and alerts in accordance with one or more implementations of the present patent application.

Figure 8A:
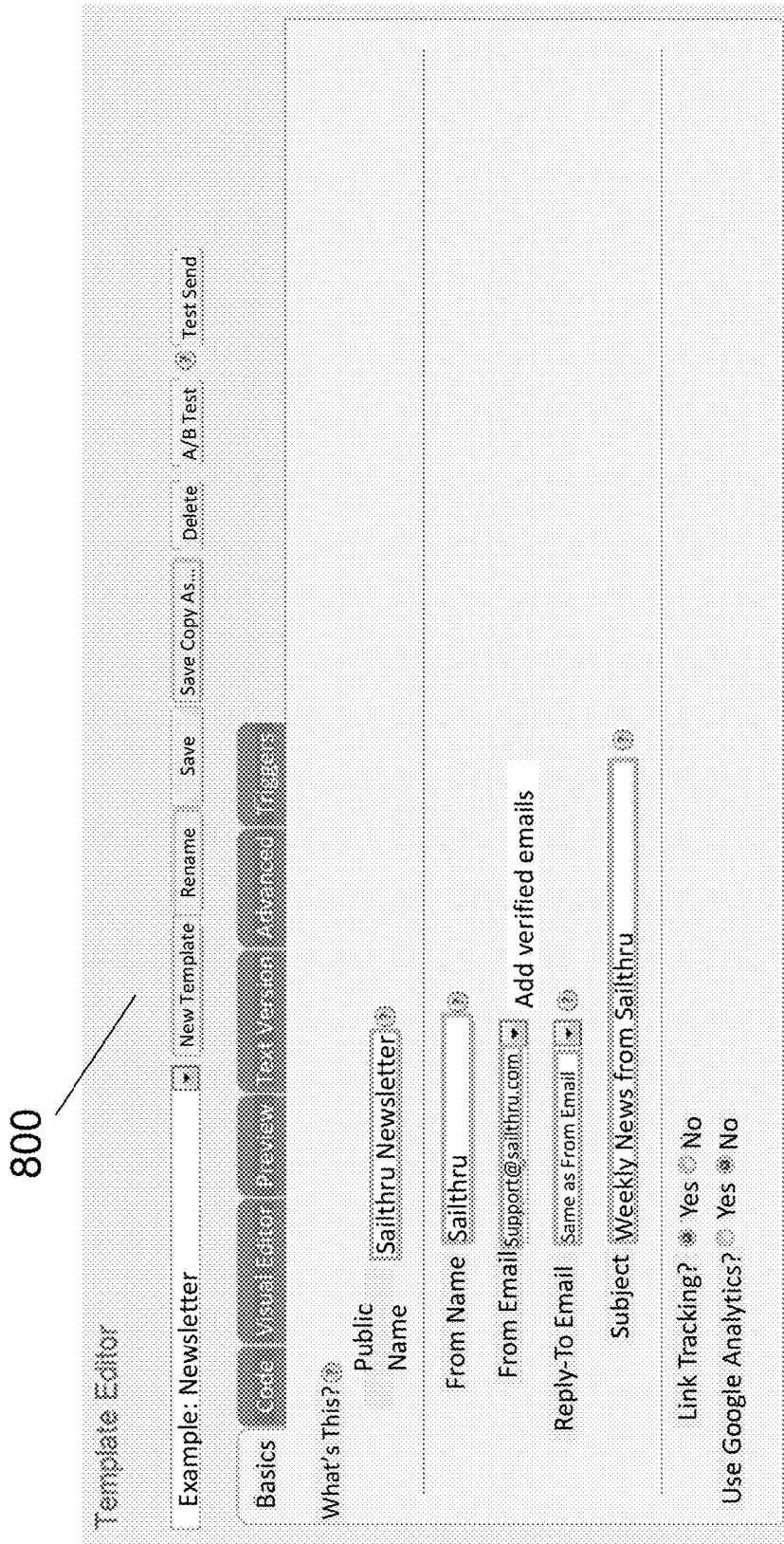
FIG. 8A-AD illustrate example display screens for creating a campaign from a template and provided in accordance with an implementation of the present application.

Referring now to FIG. 8A, display screen 800 includes various graphical screen controls for generating an email campaign. In one or more implementations, template module 508 is usable for users 304 to generate, for example, email campaigns. In the example shown in display screen 800, a newsletter is being generated via templates creation module 508. Options have been provided to identify the name of party sending the respective email, a reply to email address and a subject line for the email campaign. Additionally link tracking has been activated, to enable the user 304 to identify whether one or more hyperlinks that were selected within the email, and an option for tracking analytics has been set to "No" (to preclude using analytics for this campaign).

Figure 10:
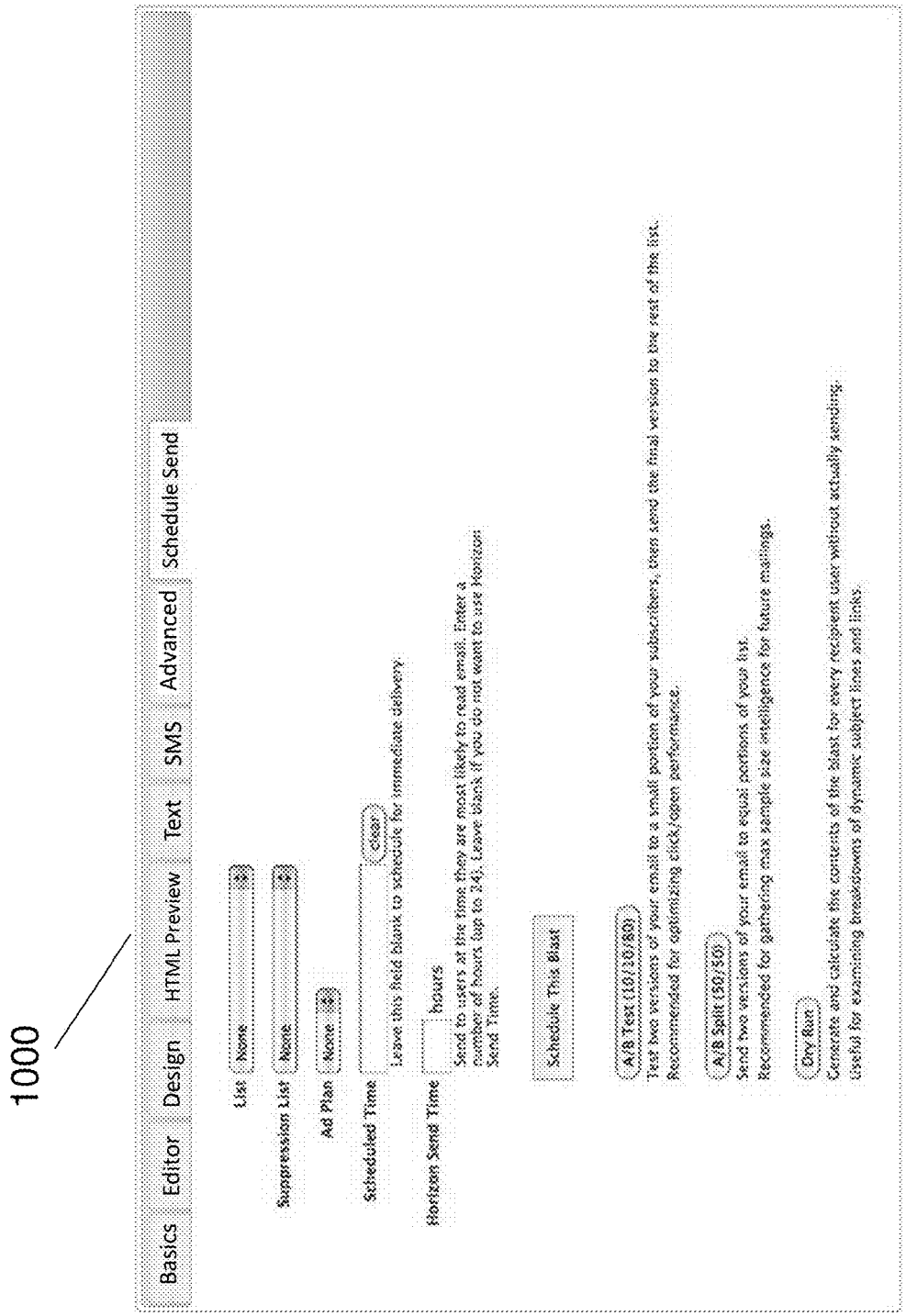
FIG. 10 illustrates an example display screen that includes options associated with scheduling and defining campaigns.

In addition to the options displayed in display screen 800, users 304 can set up a campaign email via a "Campaigns" tab provided in the user interface, which can include options to design a new template, to rename a template (or campaign that is developed based on a template), and to save a name for a campaign that customers 306 may see, such as on an "opt-out" page. Other options may include options to change a public name for a campaign, as well as options to save a campaign. Options can also be provided to include choices to modify campaigns, deleting templates, "A/B Test" for testing two versions of a transactional email, testing a template to transmit a template to an email address (FIG. 10). Other options may include defining a schedule for sending a campaign (FIG. 10), selectable email lists that users 304 use to define recipients (FIG. 8C), date and time options for scheduling (FIG. 10), defining whether a campaign should be delivered immediately (not shown). Moreover, users 304 may define an API 502 call for submitting a campaign blast, for allowing public sharing, for link tracking, and for using analytics.

Figure 8B:
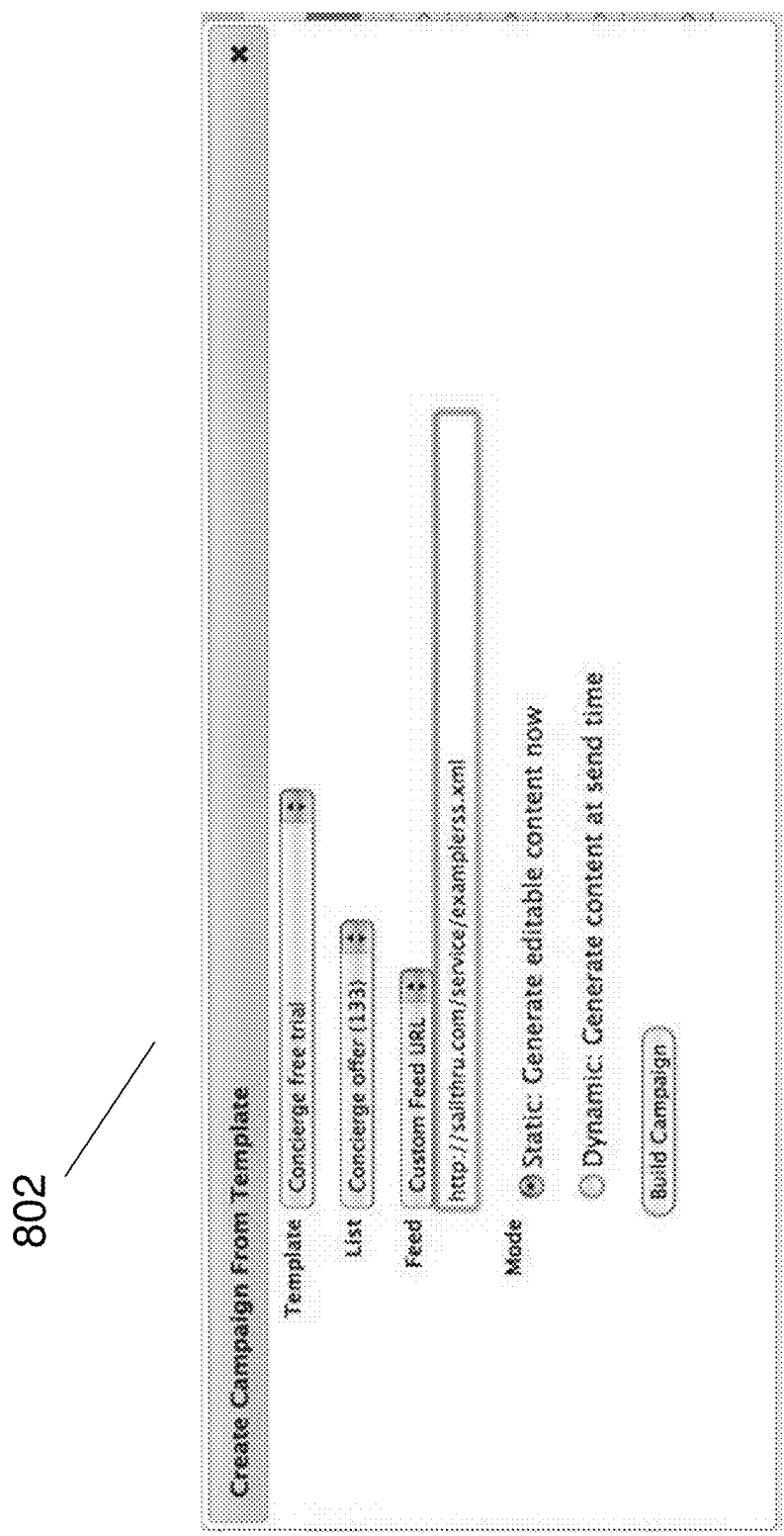

FIG. 8B illustrates an example display screen 802 that demonstrates additional functionality for creating campaign via template module 508. The example shown in display screen 802 includes options for selecting a template name, an email mailing list, and a data feed source via respective graphical screen controls (e.g., drop-down lists). Options are also provided for generating editable content (static) or generating content at send time (dynamic). Thereafter, an option button is provided that, when selected, results in instructions being executed to build the campaign.

Thus, as shown and/or described herein, email campaigns can be defined and sent to recipients associated with a mailing list. Users 304 may upload lists via an option provided within a user interface to manage lists. For example, a user selects an option to create a list, enters the name of new list. Options may be provided to view list names, to view the list pages, upload a text file containing emails, and/or submit an email to receive an email when a list has finished importing. In an embodiment, users can subscribe and unsubscribe emails to a list using an email API 502 call.

Figure 8C:
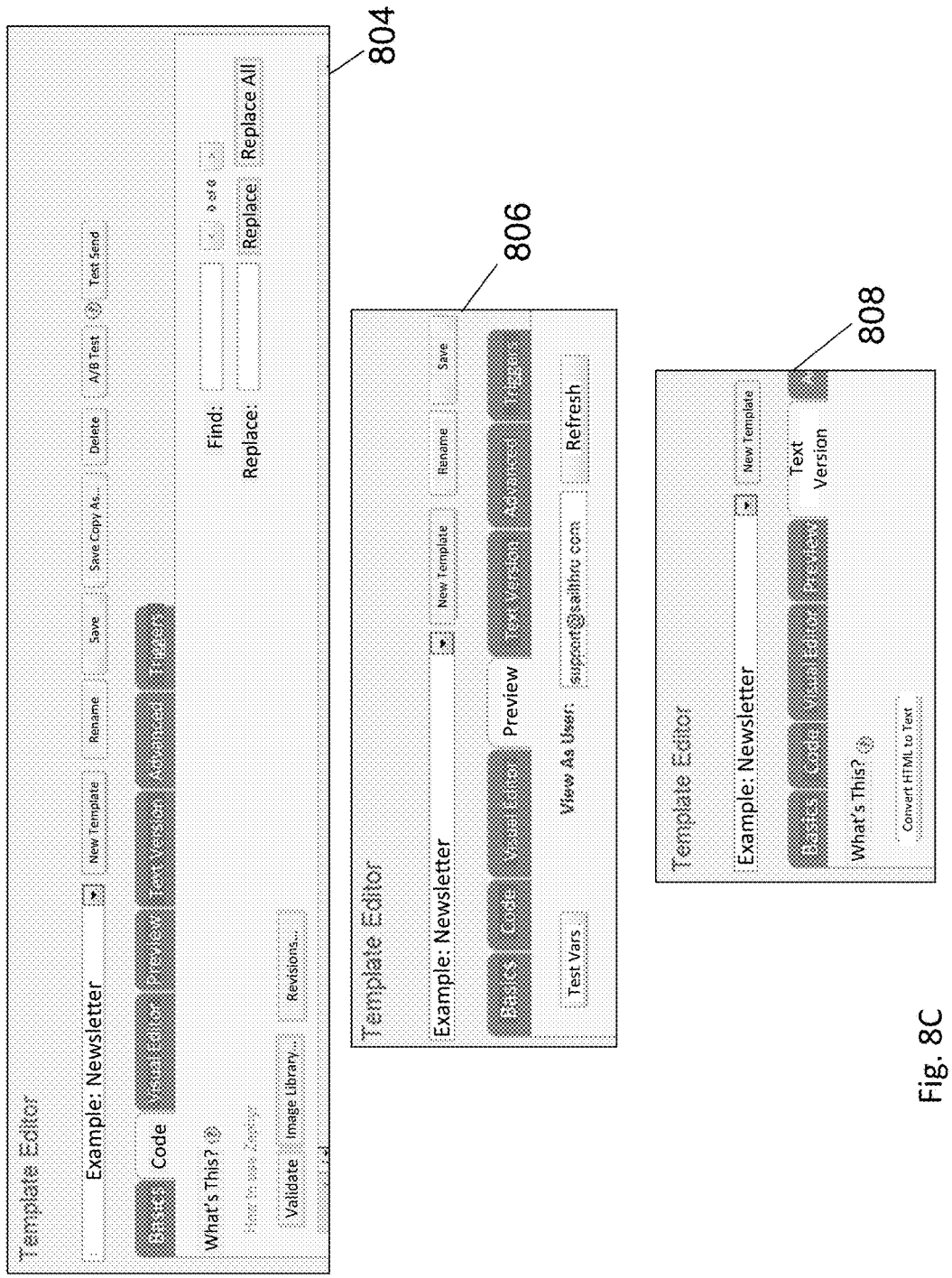

FIG. 8C illustrates example display screens 804, 806 and 808, and functionality provided therein associated with editing a template, such as via template module 508. Each of the example display screens in FIG. 8C regards functionality associated with an example newsletter template. For example, display screen 804 includes functionality for viewing and editing programming source code, such as Zephyr script. Display screen 806 provides preview functionality for a template, and allows users 304 to preview a template prior to using the template in an email campaign. Further and in the example display screen 806 shown in FIG. 8C, options are provided that, when selected, result in instructions being executed to test variables, define an email address for viewing the template as a respective user, and refreshing content. Display screen 808 includes functionality associated with providing a text version of a template. For example, an option button is provided that, when selected, results in instructions being executed to convert a web page, for example, derived from a template, from HTML to plain text.

Figure 8D:
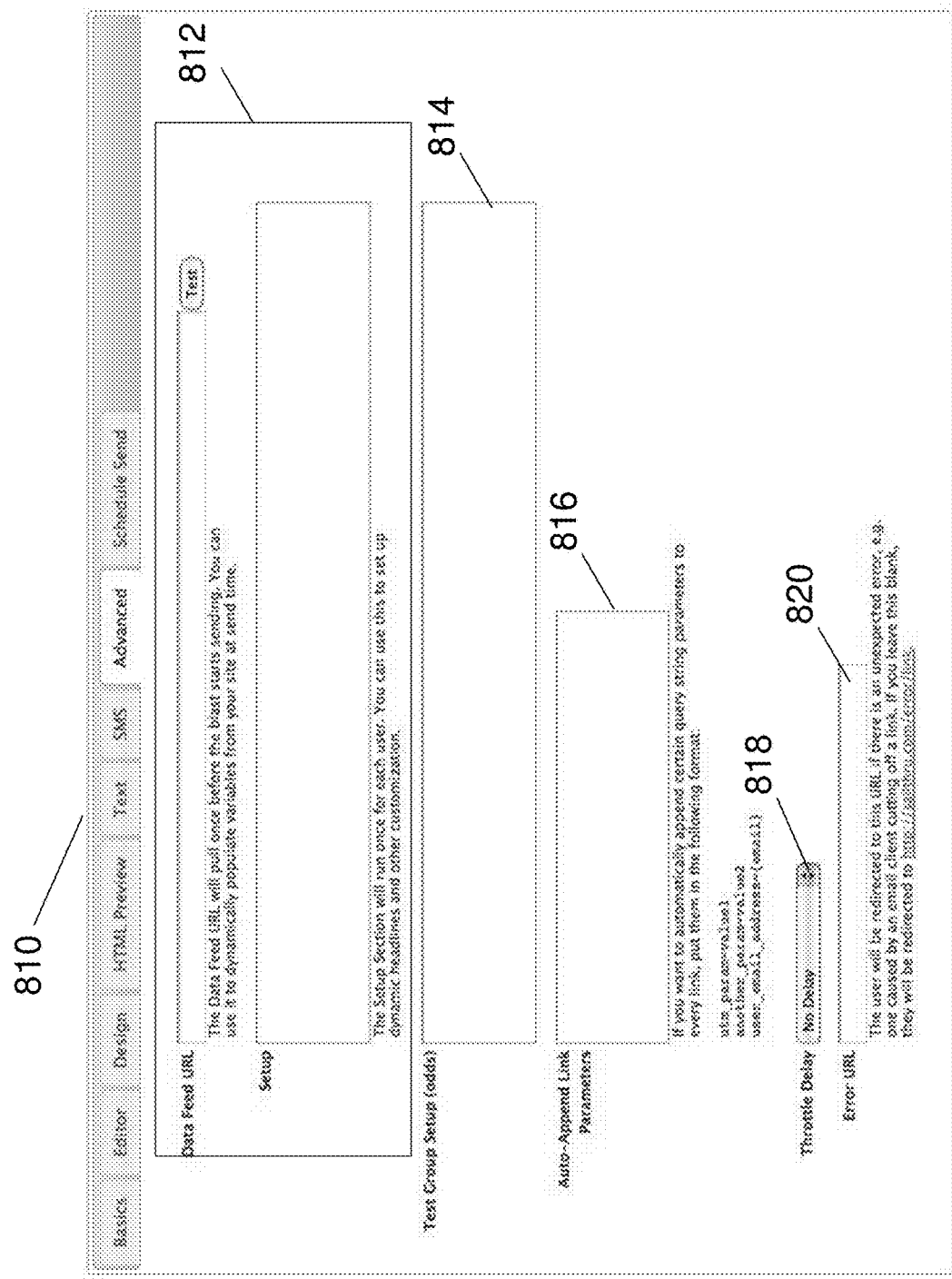

FIG. 8D includes display screen 810, which includes advanced options 812, 814 and 816 in connection with editing a template, such as via template module 508. Option 812, for example, provides options for users to define data and content feed for campaigns. For example, data feed URL can be entered and tested that points to data that can be used to dynamically populate variables, such as from a user's 304 Internet website, at the time when an email campaign is launched. Furthermore, a set up section is provided that can be configured to run once for each user 304, for example, to set up dynamic headlines and other customization an email campaigns. Thus, advanced option 812 is useful for dynamically providing information to customers 306. Advanced option 814 includes a data entry control for a user 304 to define a test group, and advanced option 816 provides the ability to append parameters to hyperlinks automatically. In the example shown in option 816, example programming source code in the form of a Zephyr script is provided as an example for the user. Further, throttle delay control 818 is included in example display screen 810 that is usable to control the rate and/or time that a campaign, alert or other content is provided to a customer 306.

Figure 9:
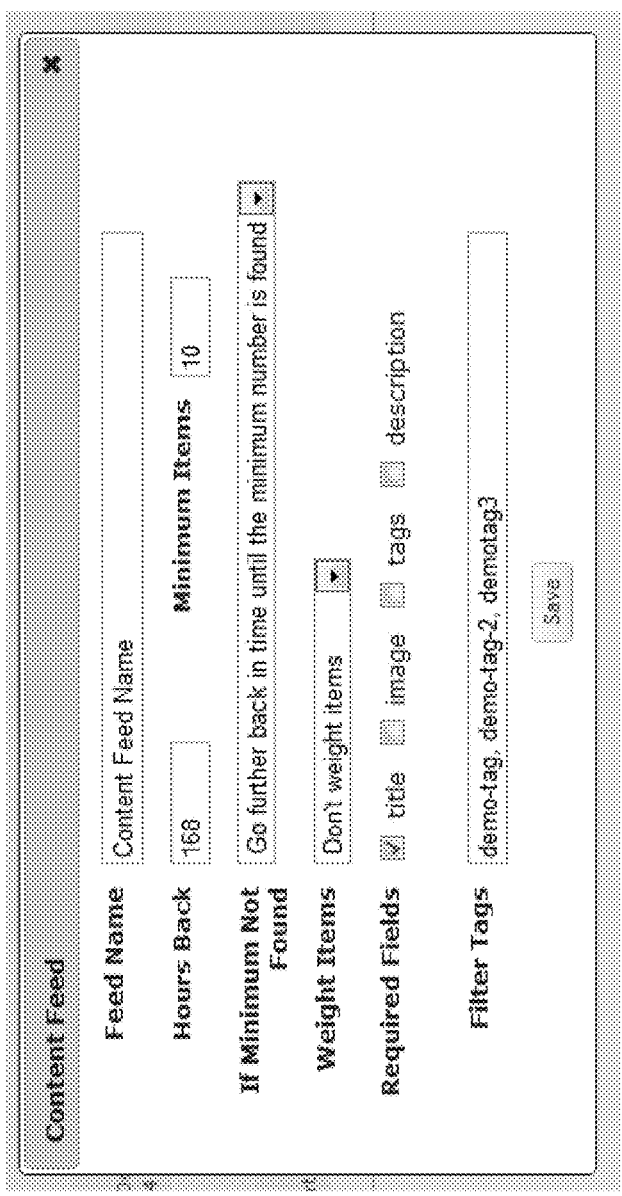
FIG. 9 illustrates an example display screen that includes options associated with providing custom content from a data feed.

FIG. 9 illustrates an example data entry display screen 900 that includes options associated with providing custom content that originates from a data feed, such as via content feed module 510 (FIG. 5). Replacement variables can be placed in the various parts of an email message, such as: From, Name, and Subject. In the example shown in FIG. 9, options are provided for defining a content feed name, a number of hours back, a minimum number of items, and for providing a directive in the event that a minimum number of items are not found. In the example shown in FIG. 9, a directive is provided to go further back in time until the minimum number of items is found. In addition, display screen 900 includes an option to weight items, such as for example based on user preference or importance. Additionally, checkbox options are available for required fields, such as title, image, tags and description, and a data entry control is provided for filter tags, to filter for specific content from the feed. In addition, multiple data feeds can be supported, for example, using a feed manager interface. For example, users 304 can merge two or more feeds, which can operate to add a complex JSON feed to a feed library, which users 304 can use to populate templates/campaigns. In one or more implementations content feeds are data feeds based on content crawled by a spider or manually added to the system via API 502. Users 304 may create a content feed, and, in one or more implementations, JSON provides metadata from a feed description.

In one or more implementations of the present application, a custom data feed format is JSON. When users 304 provide data in JSON format, users use the MIME Content-type header application/JSON or text/JavaScript. In JSON format, users 304 can pass data in the form of a single JSON object. The top-level keys of the object represent replacement variables in the body of an email message. XML feeds may be converted to JSON in a fairly straightforward way: individual elements become individual keys. Attributes can be represented as a key named @attribute. When attributes are mixed with content, the content is represented as #text.

Thus and as a function of content feed module 510, the present application supports significant personalization for customers' 306 email and website experiences. Content may be added or updated to data processing apparatus 102, thereby triggering matching alerts for customers 306, such as related to various aspects of ecommerce from recording an ecommerce shopping cart or checkout event to track abandoned shopping carts.

In addition to defining campaigns, alerts or other content based on templates, the present application provides for sophisticated scheduling options and definitions, such as via scheduling module 512 (FIG. 5). FIG. 10 illustrates an example display screen 1000 that includes graphical screen controls that provide data options associated with scheduling and defining campaigns. Example options set forth in the example display screen 1000 enable users 304 to define mailing lists, suppression lists, ad plans, schedule times and specific hours. For example, campaigns may be sent to customers 306 at specific times when customers 306 are considered to be more likely to read or pay attention to an email message.

In one or more implementations, a suppression list represents a list of email addresses that a user 304 does not want an email campaign sent. Such lists may be obtained, for example, from an advertiser. In addition, the present application supports smart lists, which may be dynamically generated lists that automatically update according to particular criteria. For example, users 304 create a smart list of all of customers 306 in New York who are interested in technology. Smart lists, as used herein, are dynamically populated lists, and users 304 may not directly add or remove members therefrom. Users 304 may instead indirectly add or remove users by updating their underlying data. Users can use smart lists as a form of "list segmentation," as well as also use smart lists to integrate multiple lists, search for user interests across an entire subscriber base, or for other functionality.

Moreover, display screen 1000 includes an option for A/B testing and splitting. As used herein, "A/B Testing," refers generally to an ability for users 304 to test different versions of campaign emails against pre-defined or randomly selected segments of an audience. In one embodiment, 50% of an audience gets one version, 50% of an audience gets another, which is useful when users 304 are trying to establish general design principles for an audience and get information for future mailings. In another implementation, 10% of an audience gets one version, 10% of an audience gets another, and the better performing version is sent to the remaining 80%. This is useful for optimizing a particular mailing. For example, users 304 may come up with two subject lines and try them both out. When users 304 determine which one is better, users can use it on the rest of the list, so 90% of the audience gets the most effective subject line. In yet another embodiment, a first version of an email campaign is defined as normal. Moreover, a user may select either A/B Test or A/B Split, and a campaign email will be split into two or three different campaign emails, which can each individually be modified.

Figure 11:
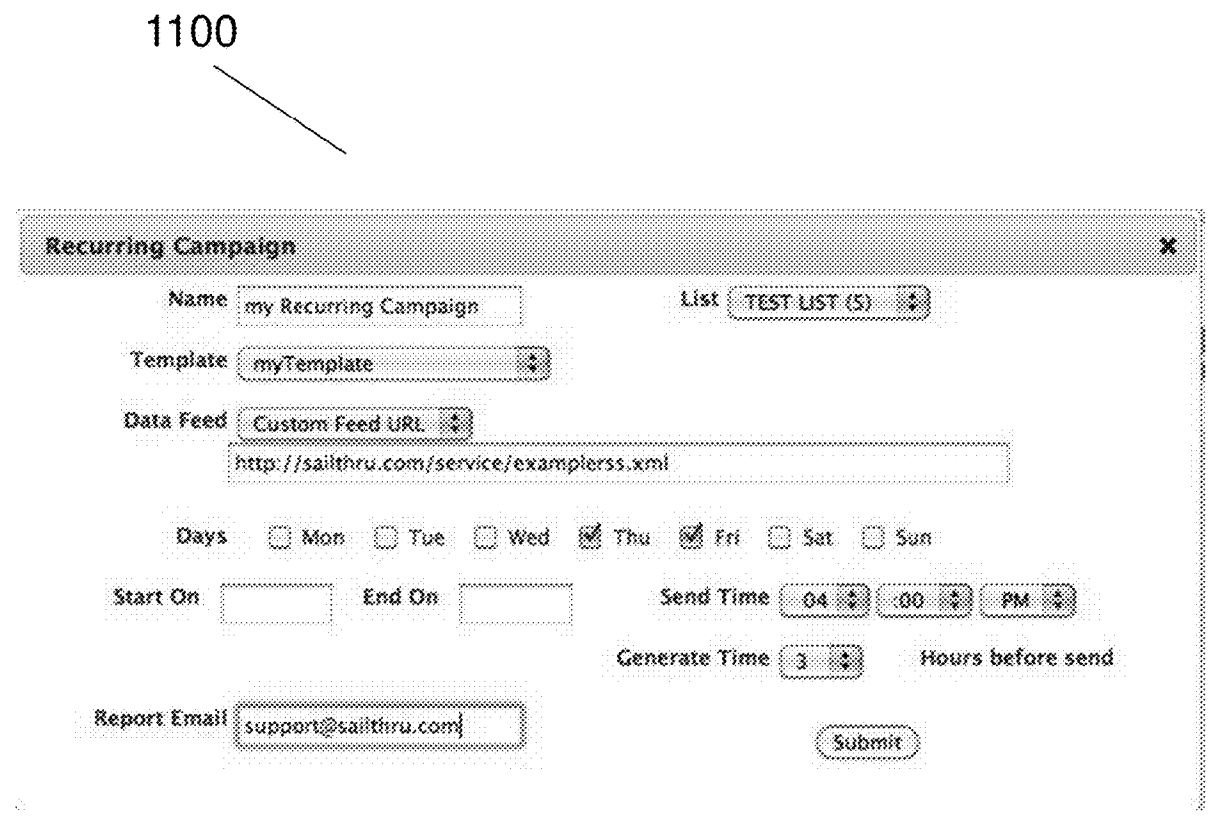

In addition, campaigns may be defined to be recurring, such as via scheduling module 512 (FIG. 5). FIG. 11 illustrates an example data entry display screen 1100 that includes options for defining a recurring campaign. In the example shown in FIG. 11, options are provided for naming a recurring campaign, identifying a mailing list for the recurring campaign, selecting a template, and identifying a respective data feed. Moreover, options are provided to define days of the week, starting and ending dates, send times, and amount of time in hours to define to generate the campaign prior to sending the campaign to email recipients (e.g., customers 306). In addition, a reporting email can be set in the display screen 1100, and when the user 304 is satisfied with the settings, the user can select a graphical screen control, such as a button labeled submit. Once selected, instructions can be executed to define the recurring campaign.

Figure 12:
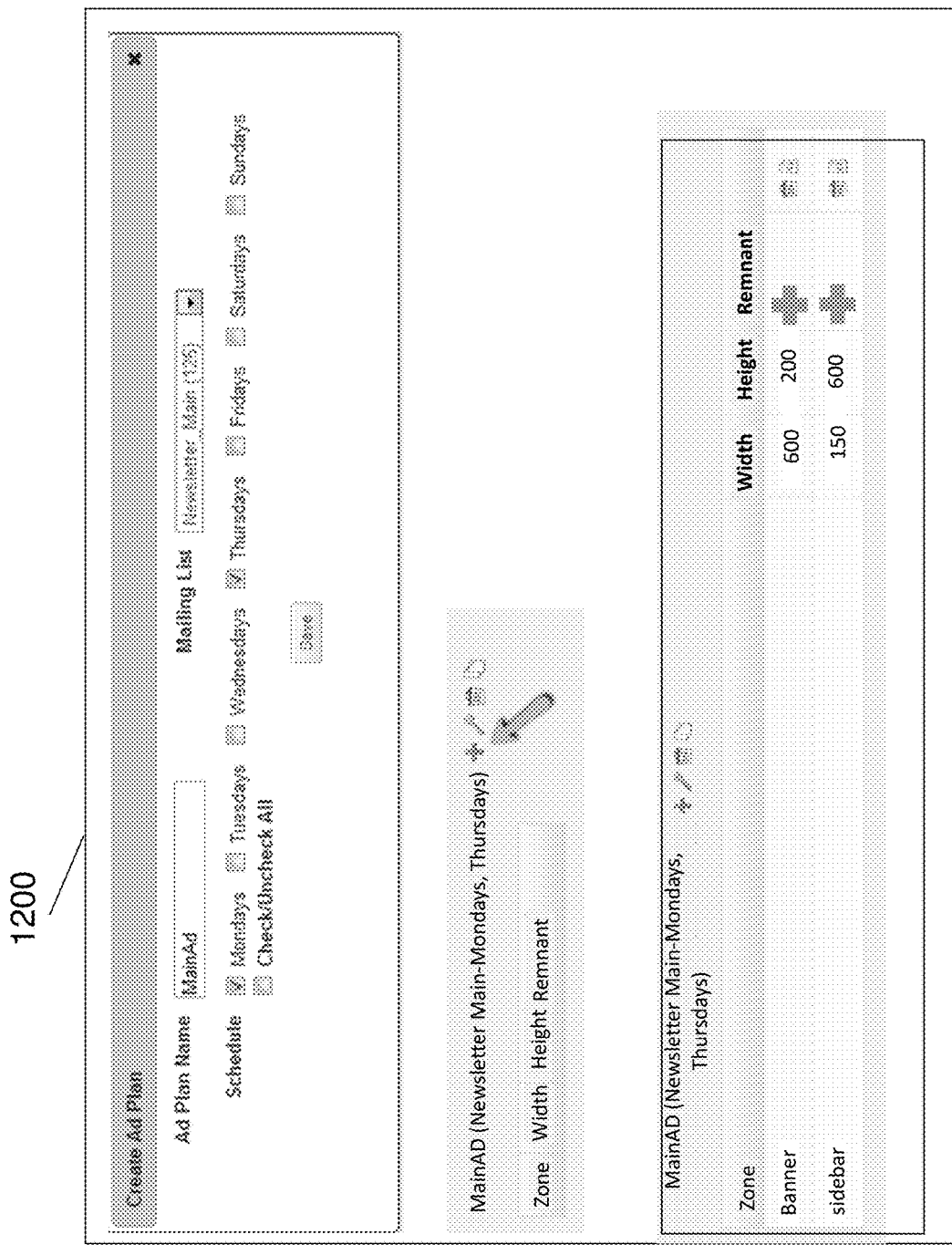
FIG. 12 illustrates an example data entry display screen that includes options for creating an advertisement plan in accordance with an example implementation of the present application.

Further, the present application supports an advertisement management platform that works in conjunction with the respective features shown and described herein. FIG. 12 illustrates an example data entry display screen 1200 that includes options for creating an advertisement plan such as via advertisement format module 514 (FIG. 5). Options may be provided to create a new ad plan, such as to be sent twice a week, list(s) to which the ad will be sent, zones in which ads are placed, including height and width that correspond to the ad space coded into the chosen template. In the example shown in FIG. 12, data entry controls are provided for the user to submit an ad plan name, a mailing list and respective days for the ad plan, as well as zone, banner in sidebar options.

In one or more implementations, the advertisement format module 514 can further include one or more prompts (not shown) to receive geo-location information from a user 304 operating a user computing device 104. Using the information received from the user 304, at least some advertising information can be selected by the data processing apparatus 102 for a first group of a plurality of recipients of, for example, an email campaign, and to select at least some other advertising information for a second group of the plurality of recipients. In this way, respective groups of recipients can receive particular advertising content as a function of their respective geo-location information.

In one or more implementations, a behavioral-tracking system and method is provided that gathers data on customers' 306 individual interests based on activity, such as on a website or mobile app ("App"), via behavioral tracking module 516 (FIG. 5). This enables custom targeting of customers 306 based on their respective purchases, browsing experience, and explored interests. By gathering and using information such as shown and/or described herein, the number of clicks, page views and user engagement can be increased. Moreover, metadata associated with content is used and interest tags with a customer's 306 interest profile are stored. For example, a customer 306 browses the site of a major tech news site and also interacts frequently with a newsletter provided in accordance with the teachings herein. Through each interaction, information is learned and stored about the customer 306, denoting her clicks on articles about various topics. This also provides an advantage to e-commerce sites by allowing targeting of customers 306 based on purchase intent and history. Moreover, individual user profiles allow for dynamically generated content based on each user's profile and purchase history. User interests are collected based on these tags and weighted compared to the overall interests of users across a user's 304 site. For each user and each tag, a count (e.g., raw count of the number of page views the user has had for that tag) and an interest level is stored. Page views may be calculated for sites containing a corresponding code snippet on respective pages. Interest level compares the customer's 306 count relative to other users across a client's 304 site. Customers 306 with an interest score of two times the average customer 306 are considered to have high interest in that topic.

In one or more implementations, campaign detail reports are provided that provide information, such as identifying unique clicks for each link within an email, engagement levels, signup dates (or list upload date if signup date was not imported as a variable), domains, and or user engagement with an email since an email was sent. Reports may also include information identifying links that were included in a campaign email with sent/click rate/total click/purchase statistics, per individual link. Reports may also identify the top users of each campaign email broken down by their open time/click time/first URL.

By tracking the number of customers 306 who click on emails provided by users 304, a useful measure of customer 306 responses is provided. In particular, users 304 may select an option for link tracking to measure activity, such as clicks, of hyperlinks set forth in email messages. In one non-limiting example, links that are defined by a user 304 are rewritten to go to a link domain that users 304 previously defined. Various analytics is supported, for example, to enable users 304 to identify traffic coming from email messages. An example display screen 800 is shown in FIG. 8 that represents customer 306 behavioral information and analytic information for a user 304.

Moreover, the present application may include a query builder, such as via behavioral tracking module 516, that allows users 304 to query a campaign detail report according to desired criteria. Further, queries can be saved as a list. Information provided in a report may further be downloaded in one or more data files.

Other information provided in reports can include an indication that an individual email campaign has been sent to a list or list segment, the number of emails sent in a campaign, which corresponds to a number of valid email addresses within an associated list. Information may further be provided that identifies a number of unique opens in a particular campaign from users with images turned on (e.g., via tracking objects), and may indicate a minimum number of customers 306 who opened an email, as well as number of customers 306 who did not have images turned on, but made a mouse selection (e.g., a click). Other information may be provided for an estimation of a total number of customers 306 who opened an email associated with a campaign, regardless of whether the customers 306 had images turned on. The estimate may be calculated based on a ratio of opens to clicks, but only for customers 306 with images turned on. The ratio may then be multiplied by the total number of customers 306 who clicked, which represents a best-guess metric of a percentage of an email campaign audience that is actually reading email.

Moreover, a metric may be available for customers 306 who make a purchase call via an API 502, enabling revenue from purchases to be tracked and reported. In addition, information representing a number of page views generated from interaction with a particular email message may be provided, as well as revenue generated per thousand impressions. This metric is available for clients 304 who are selling ads against page views, or who have implemented the purchase API 502 call to track purchases. Clients 304 may define the value per thousand page views on a settings page of an account. Other information that may be reported included whether a failed delivery of an email occurred, such as due to a permanent reason such as a non-existent address. In such event, the non-existent address may be automatically removed from a list and not be mailed to again. In addition to non-existent email addresses, a report of a delivery problem or failed delivery resulting from, for example, failure at the server level, resource exhaustion such as a full disc, or because of spam filters. A softbounced message may eventually be delivered and redelivery attempts. Further a report may be provided for a number of times a blast has been reported as spam by users.

Figure 13:
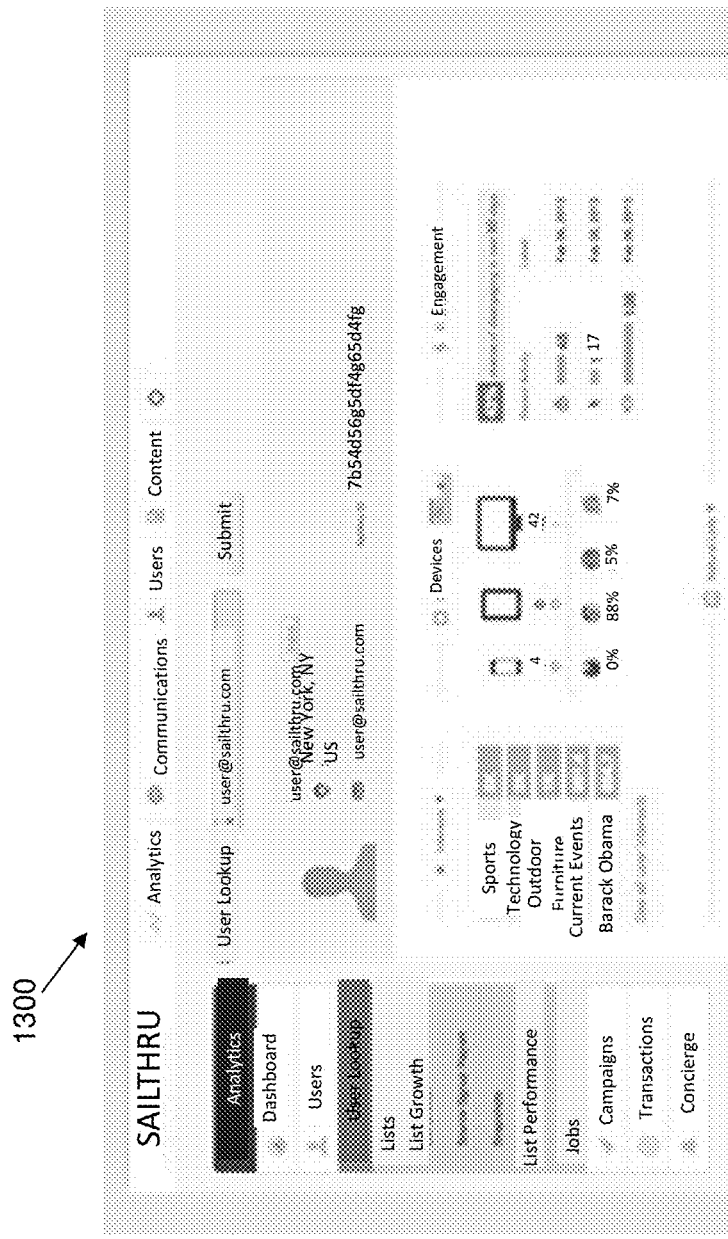
FIG. 13 illustrates an example entry display screen 1300 that includes analytics in accordance with an example implementation of the present application.

FIG. 13 illustrates an example entry display screen 1300 that includes analytics in accordance with an example implementation of the present application.

In one or more implementations, users 304 can generate a list using specific criteria (such as openers, or people located in New York City) and each time a customer 306 comes on to the source list with matching criteria, (s)he is added to the appropriate smart lists. Users 304 can choose a source list, name a smart list, and build a query string. Also, as shown and/or described herein, tracking objects can be used to track instances of an email message being opened.

In addition, the present application supports different categories of email recipient lists, such as primary lists, secondary lists, and smart lists, and data processing apparatus 102 can be configured to use the respective categories of lists in various contexts. For examples, email campaigns may be sent to primary and secondary lists in order of engagement levels, sending to most engaged/active customers 306 first. When users 304 create a new list for the first time, the list may be defined by default as a secondary list, which can be changed, such as by selecting a checkbox. Primary lists represent a main lists of customers 306 who have subscribed to receive email campaigns. Such customers 306 may be tracked and represented in one or more reports. In one non-limiting example, users 304 define a single primary list per separate email campaign (e.g., a newsletter) that is being sent. Users 304 may define many primary lists, for example, to be associated with various email campaigns.

The present application supports tracking of email recipients using geo-location functionality. User interactions (e.g., opens and clicks) with communications, such as provided via a user 304, may be substantially automatically tracked and ranked by using geo-location information, and can be used to generate lists. Geo-location lists may be created using a query builder, described above. For example, within the query builder, a user 304 selects geo-location city, state or country from a criteria drop-down list. Customer 306 locations may be defined by the relative number of times the customers engage with their emails in a given location.

In one or more implementations, an on-site recommendation tool is provided via on site recommendation module 518 that can include a small "slider" screen control to appear in a customer's 306 browser window at the end of an article that the customer is reading. The slider may suggest another story based on the customer's 306 interest. Users 304 may use CSS styles on a respective web page to change the look and feel of the recommendation tool, for example, using various class hooks. Users 304 may also adjust some of the recommendation behavior of the tool, for example, at a settings page provided in a user interface provided via data processing apparatus 102.

In connection with the on-site recommendation tool, various parameters may be provided for users 304 to provide customized functionality and appearance. Various graphical screen controls may include, for example, recommender box to display from top or bottom of a display window and/or a threshold (e.g., within shorter page/mouse scrolls and vice-versa). Users 304 may define the amount of time to delay a recommendation box in milliseconds, an amount of space to offset a recommendation box, and various display (e.g., decoration) options. In addition, users 304 may define filters for identifying particular information (e.g., sports).

In one or more implementations and in connection with the on-site recommendation tool that displays relevant content to users when viewing a particular page, functionality is provided for gathering data on customers' 306 individual interests, such as based on their activity on a user's 304 website, via the customers' 306 computers, mobile devices, tablets or other devices 304. Information associated with various devices may be tied to each customer's 306 respective email address(es). In one or more implementations, the on-site recommendation tool uses an interest profile associated with a customer 306 to present a list of content likely to appeal to respective customers 306. In one or more implementations, customers 306 may register with data processing apparatus 102, such as via signup pages developed and/or distributed by user 304, which enables interest profiles to be generated and updated as customers 306 interact with content. In case a customer's 306 interest data is not available or present (e.g., the customer 306 is not subscribed to a given newsletter), then other information may be used for populating an interest profile, such as recent browsing history that may be stored in a cookie or elsewhere. Content may be weighted by various parameters, such as browsing history, purchase history, email click history and general popularity of site content.

As noted herein, in addition to email campaigns, the present application provides functionality for users 304 to implement in connection with Internet web sites. For example, functionality may be provided such that new URLs on a user's 304 site that have not been previously detected or identified will automatically identify that URL. In one or more implementations, the "spider" provided in accordance with the present application does not "crawl" through pages automatically following links, but instead identifies new URLs once. While identifying new URLs, certain metatags in a user's 304 document's <head> tag are identified. Although such metatags can be optional, including metatags can enable users 304 to ensure that certain content properties associated with the present application are substantially automatically populated, which improves information. For most properties, users 304 may use a generic metatag (one that may have in been in place previously), an Open Graph tag (og:) or other metatag.

In the event that users have a secure web site that requires login, users 304 may provide authorization for the content spider of the present application to automatically access the pages. For example, the spider may pass a unique HTTP User-Agent header and that is specific to a user's 304 account. This may grant the User-Agent access to the secure site. In a specific, non-limiting example, a user 304 logs into a web site provided by data processing apparatus 102 (e.g., by submitting authentication provided during a registration process), and accesses settings under an "Account" tab. The user 304 selects an icon that is formatted as a lock, and selects options and provides information to allow access to a spider.

In addition, the present application provides a mobile tracker application that may include a combination of the content recommendation and behavioral tracking features of the present application for customers 306 using mobile computing devices 104. In one or more implementations, a mobile tracking application is provided for tracking user data in connection with email, such as via mobile tracking module 520 (FIG. 5). Various identifiers can be used, including profile data of recipients, to provide a solution for tracking mobile device 104 usage. In one or more implementations, program and/or computing resources or the like, are handled by the user computing device 104 (e.g., at the client).

The present application can also include a software development kit (e.g., SDK) for developing custom mobile apps. Information being tracked by the mobile tracker includes interests, events, geo-location, device used, and time. In connection with email notification, message attribution is further tracked, and information associated with delivery type and operating system (e.g., email, SMS, push notifications, and iOS) is identified and tracked. For example, a code is received by the mobile tracker application representing the delivery type and/or operating system, and transmitted back to data processing apparatus 102. Unlike known systems, mobile tracker app provides information substantially real-time to and from mobile computing devices, and valuable up to the moment information is available and accessible for users.

For example, a municipality is deciding whether to allow a particular form of advertising. Using the mobile tracker app, a notification is pushed out the moment that the municipality decides to permit the respective advertising. Parties that have been waiting to launch an advertising campaign received the notification over the mobile tracker app, and have an advantage over others who are not notified so promptly. In this way, geo-location services are particularly important into action would mobile tracker application. In one or more implementations, a parameter value may be determined or defined, such as a 50-mile radius beyond city limits for receiving the notifications.

In accordance with the present application, a mechanism is provided for a user 304 of user computing device 104 to record any type of action and or event that a customer 306 can take. Information tied directly to customers 306 can be tracked and transmitted to data processing apparatus 102 for further analysis. For example, a provider of an online education program is interested in determining how far along the students get. When a respected lesson is completed by a student, a notification is sent to data processing apparatus 102 accordingly. Using the API 502 and/or scripting options provided in accordance with the present application, various details can be determined, such as number questions that are answered, the number of correct answers, or the like. Information associated with the event, such as an identification of the user, the name of the user, the dates, or any of a plurality of customer variables, such as identified in metadata, are obtained and used by one or more analytics that may be tied to messaging campaigns. In one or more embodiments, a score may be calculated as a metric of success which is eventually tied back to a particular user. For example, information representing that a user response drew particular activity is tracked and searchable for future analysis.

In one or more implementations, various tools and features shown and described herein are further configurable for interfacing with one or more external data and content platforms. Examples of such platforms can include email service platforms, social networking platforms, e-commerce platforms or the like. Data processing apparatus 102 can be configured to interface with such platforms, including to provide one or more modules that can be integrated or otherwise included with external data platforms. Such modules can include programmed functionality for customers 306 that such external data platforms would be otherwise unable to provide. In one or more implementations, external data platforms or managed or operated by clients 304.

For example, clients 304 often include an "unsubscribe" option, such as formatted as a hyperlink, in an email campaign sent to customers 306. In one or more implementations, one or more modules can be provided by data processing apparatus 102 for integration with an external data platform for managing a user's 306 preferences, including to select preferences to control delivery of email, such as by day, sender, topic or the like. For example, an email provider provides its customers with webmail access, including a browser-based e-mail platform composing and sending email, as well as for accessing an inbox folder and various other email folders, such as known to those of ordinary skill in the art. Data processing apparatus 102 provides an email preference module, which can be integrated in the inbox provided by email provider, that enables the user to manage email preferences. In one or more implementations, meta-data is passed along with an email that is usable to trigger an alert that is transmitted to an external data platform. Upon receipt of the alert, a modal or dialogue window is instantiated in an application, such as an email inbox provided in a web-based platform, that includes selectable controls for users. Information associated with selections made by users can be transmitted to data processing apparatus 102 and used for updating and/or controlling one or more of modules 504 through 520. This enables customers 306 to stay selectively engaged with clients 304 from directly within an email inbox, without a need to log in to a specific client 304 website.

Other preference controls that can be integrated in an email provider's web-based email platform. For example, data entry and selection controls can be provided for users to select double opt-in for email subscribers and password reset links, and for product review after delivery of a confirmation email. Other functionality can include "Save Action" options, such as "read later" links such as to save a URL that points to an article provided by client 304 to a list or other retrievable source, save coupons for future use, and saving references of music or multimedia content. Other controls can include e-commerce purchasing functionality, tracking functionality, such as for packages and orders, providing travel information (e.g., flights or train schedule or status information), event registrations, and for enabling users to RSVP to one or more events. Information associated with selections made by users associated with such controls can be transmitted to data processing apparatus 102 and, thereafter, used for updating and/or controlling one or more of modules 504 through 520. In addition, data processing apparatus 102 can use the information received to query third-party data sources and return information received in response thereto, and/or enable the email provider to do so.

The present application supports integrating functionality into external platforms using, for example, a data schema, such as for events and reservations, based on information associated with customer 306 activity, such as purchases, profiles, and responses to email campaigns. Programming source code, such as Zephyr script, can be executed by one or more processors to access information associated with one or more customers 306 and provide such information in one or more modules integrated with an external data platform. The modules can use the information to display corresponding content.

Figure 14:
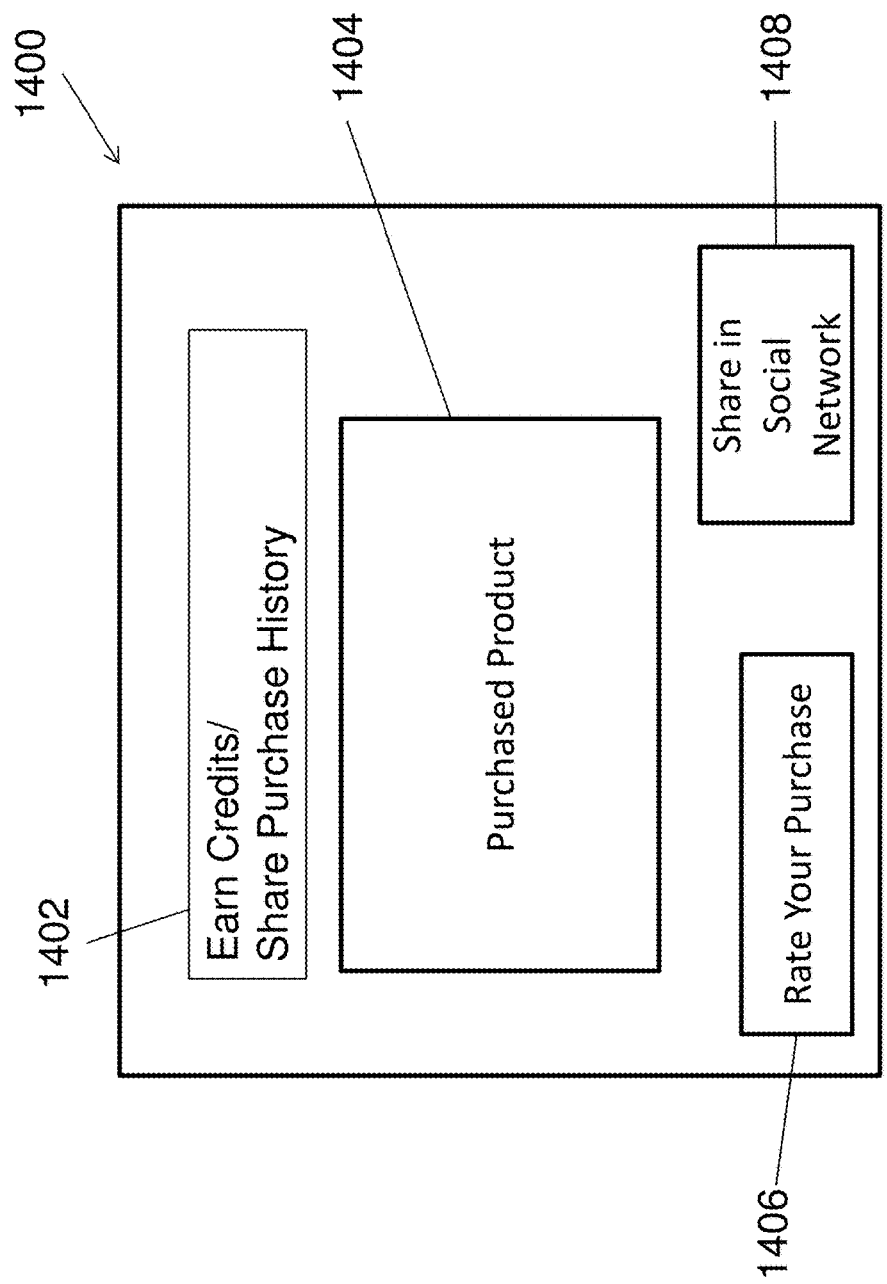
FIG. 14 is a block diagram illustrating functional elements included in a user interface for providing incentives, such as in connection with a loyalty program, in accordance with an example implementation with the present application.

One or more modules provided by data processing apparatus 102, such as behavioral tracking module 516, can provide a connection between a user's email address and purchase data associated with a good or service. When an email message is transmitted by a client 304, purchase information associated with a given email address can be tracked by data processing apparatus 102 and used as meta-information to customize content in the email. In addition to customizing content in email correspondence, the present application can include functionality for external data platforms to provide loyalty programs and referrals. FIG. 14 is a block diagram illustrating functional elements included in a user interface 1400 for providing incentives, such as in connection with a loyalty program, in accordance with an example implementation. User interface module 1400 can be configured as a module that is distributable by data processing apparatus 102 for integration with one or more external data platforms. For example, a selectable option 1402 can be provided for a user to earn credits in exchange for sharing information about the user's purchase history. Prompts 1404, 1406 and 1408 can be provided for users to submit information about purchased products, to provide information associated with purchase ratings, and to share such information, such as in a social network. Product information that has been purchased by a user can be automatically populated in prompt 1404, as a function of user profile information accessible by data processing apparatus 102 and transmitted to an external data platform implementing the user interface module 1400. In response to user selections and data entry, information can be transmitted to data processing apparatus 102 for future marketing and for updating features and/or functionality associated with user interface module 1400. Credits can be used, for example, for future coupons, discounts or other benefits. User interface module 1400 is effective for a user to generate revenue or other value by sharing information about purchased products, including product reviews. The information received in connection with user module 1400 can be used by third parties, such as brands for loyalty programs. As used herein, a brand refers, generally, to an entity that provides or otherwise offers for sale goods and/or services.

Figure 15:
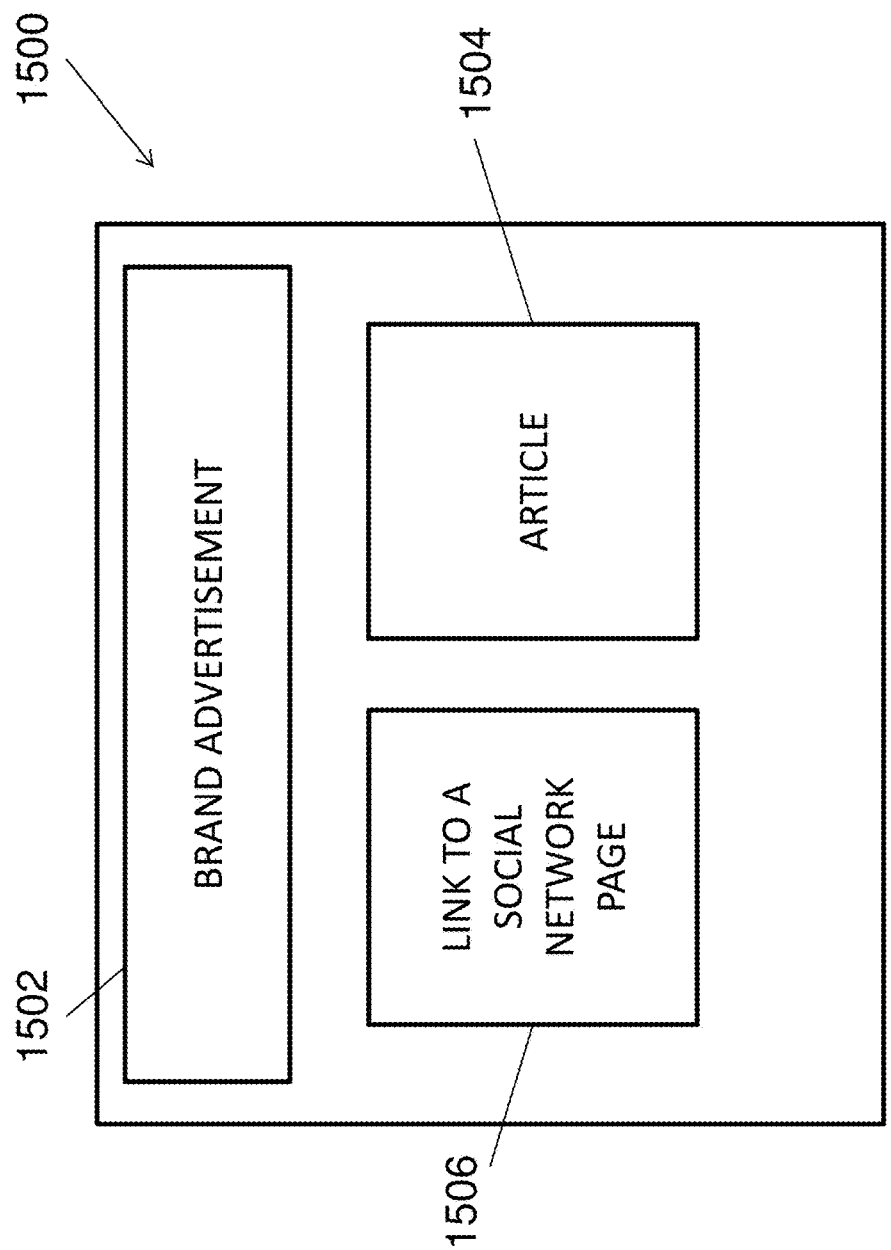
FIG. 15 is a block diagram illustrating functional elements included in a user interface for increasing user engagement with a brand, such as in connection with a social network.

FIG. 15 is a block diagram illustrating functional elements included in a user interface 1500 for increasing user engagement with a brand, such as in connection with a social network. User interface 1500 can be configured as one or more modules that can be integrated in an external data platform, such as a web-based email inbox. In the example shown in FIG. 15, a branded advertisement 1502 is displayed along with an article 1504 that is provided by a client 304. The article may be provided by the brand associated with the branded advertisement 1502, or may be provided by a different client 304. In addition, a link 1506, such as to a social network page, is provided in interface 1500 to generate traffic to a social network or other site. In this way, the present application leverages user interests, including to inject a recommended article into interface 1500 from the feed associated with meta-data that pertains to the respective user, for example as a function of the users email address. Article 1504 could be formatted as a hyperlink that, when selected, causes the user's web browser to display the article and potentially other useful information associated with the brand for the user. This provides for enhanced user engagement with the brand.

Figure 16:
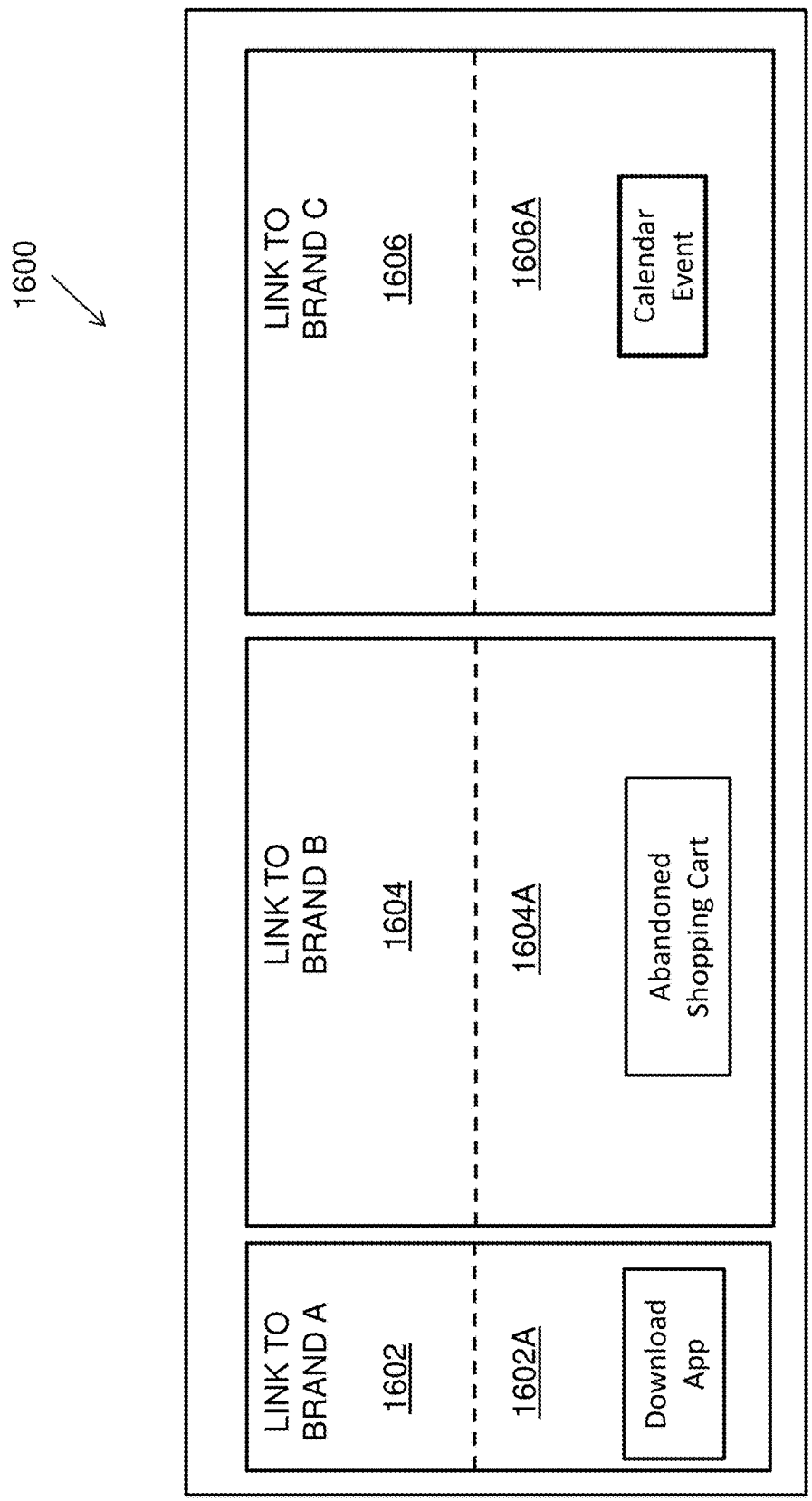
FIG. 16 is a block diagram illustrating elements included in a user interface for providing promotions and custom functionality integrated in a site associated with an external data platform, in accordance with an example implementation.

FIG. 16 is a block diagram illustrating elements included in a user interface 1600 for providing promotions and custom functionality integrated in a site associated with an external data platform (e.g., an email service provider), in accordance with an example implementation. The interface 1600 includes a grid associated with various brands (Brand A, Brand B, and Brands C), and includes links 1602, 1604 and 1606 to respective websites or other resources associated with the brands. Additionally, contextual icons 1602A, 1604A and 1606A are provided that are based on user profile or other information accessible to data processing apparatus 102 that relate to the user and the respective brands. For example, and as shown in FIG. 16, icons are displayed that are formatted as selectable links for user to download in app provided by Brand A, view the contents of an abandoned shopping cart associated with Brand B, and enter a new calendar event in connection with Brand C. By leveraging information accessible to data processing apparatus 102, such as that the user abandoned a e-commerce shopping cart on a website associated with Brand B, one or more alerts can be generated and transmitted to an external data platform, such as an email provider, and used to generate and display an icon formatted as a selectable link. Implementing one or more modules provided by data processing apparatus 102 enables new actions and controls that would otherwise be available to an external data platform, such as an email provider, for respective users.

Figure 17:
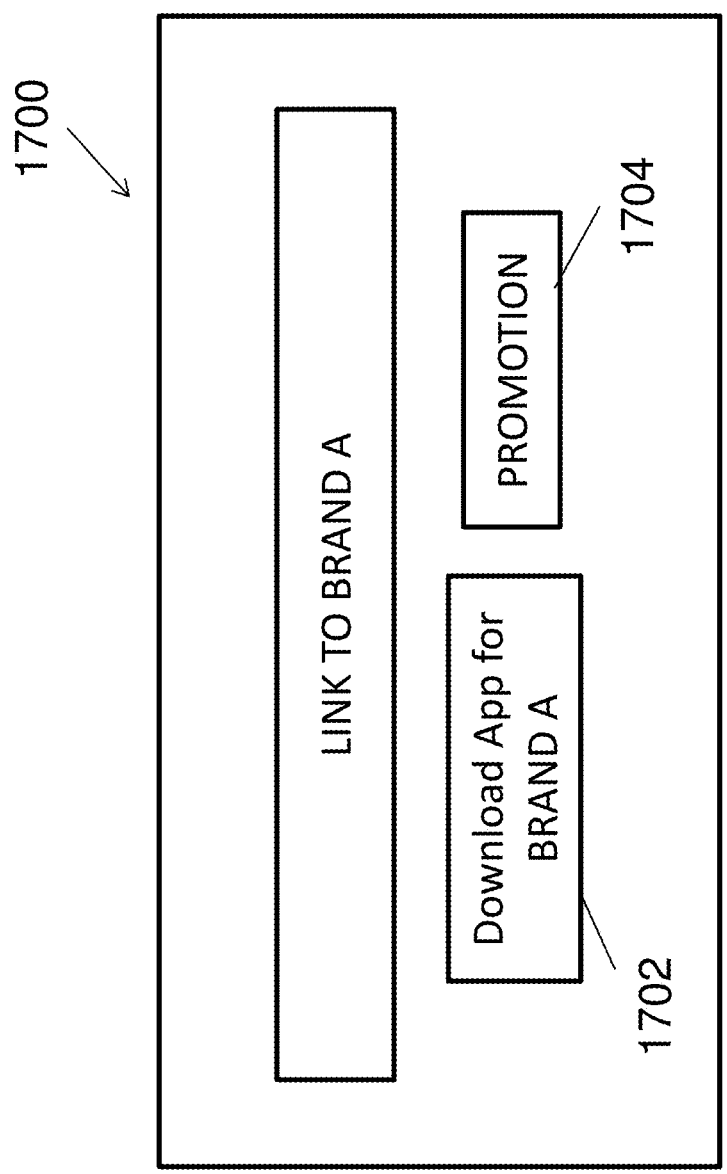
FIG. 17 is a block diagram illustrating elements included in a user interface for prompting a user to download a software application and for providing a corresponding promotion, in accordance with an example implementation.

FIG. 17 is a block diagram illustrating elements included in a user interface 1700 for prompting a user to download a software application and for providing a corresponding promotion, in accordance with an example implementation. The example interface 1700 illustrated in FIG. 17 is provided in response to a selection made by the user in 1602A (FIG. 16), and includes icon 1702 that is formatted as a selectable link for the user to download a mobile app associated with Brand A. in addition, a promotion, such as a coupon or other offer 1704 is provided for the user as a reward for selecting icon 1602A and downloading the app.

Figure 18:
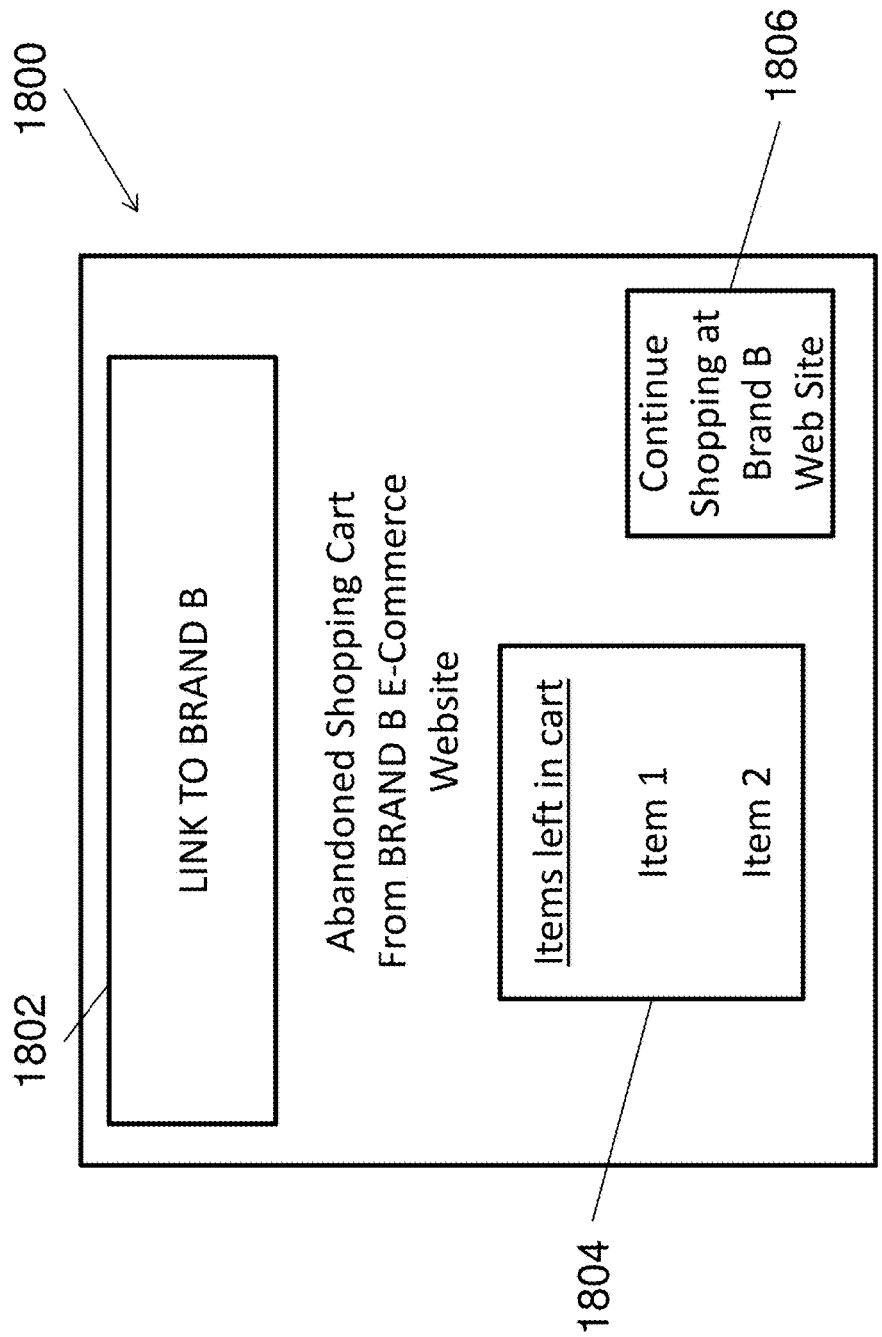
FIG. 18 is a block diagram illustrating elements included in a user interface for identifying items in an abandoned shopping cart prompting the user to continue shopping, in accordance with an example implementation.

FIG. 18 is a block diagram illustrating elements included in a user interface 1800 for identifying items in an abandoned e-commerce shopping cart, and in response to a selection of icon 1604A. As illustrated in the example interface 1800 shown in FIG. 18, a prompt 1806 is provided for the user to continue shopping at the e-commerce site provided by Brand B. In addition to an icon formatted as a hyperlink to a website or other resource associated with Brand B, the contents of the abandoned shopping cart are displayed in display section 1804. Moreover, a prompt 1806 is provided for the user to continue shopping at Brand B's e-commerce website and complete the purchase of the items in the abandoned shopping cart. Information associated with shopping cart abandonment campaigns and accessible to data processing apparatus 102 can be used to generate one or more alerts and transmitted to an external data platform implementing one or more modules associated with the present application for providing the functionality shown herein. For example, abandon card information can be passed in a products schema. When present, a cart icon is displayed with the count of items. Moreover, one or more promotions can be offered, such as discounts, for items in the cart that the user had not yet purchased. Functionality provided in connection with interface 1800 increases a likelihood that a user will complete the purchase of items in an otherwise abandoned e-commerce shopping cart. The external data platform (e.g., email provider) can leverage such functionality, including by charging the brand a portion of the purchase price, flat fee, or other suitable amount for effectively brokering the sale.

Figure 19:
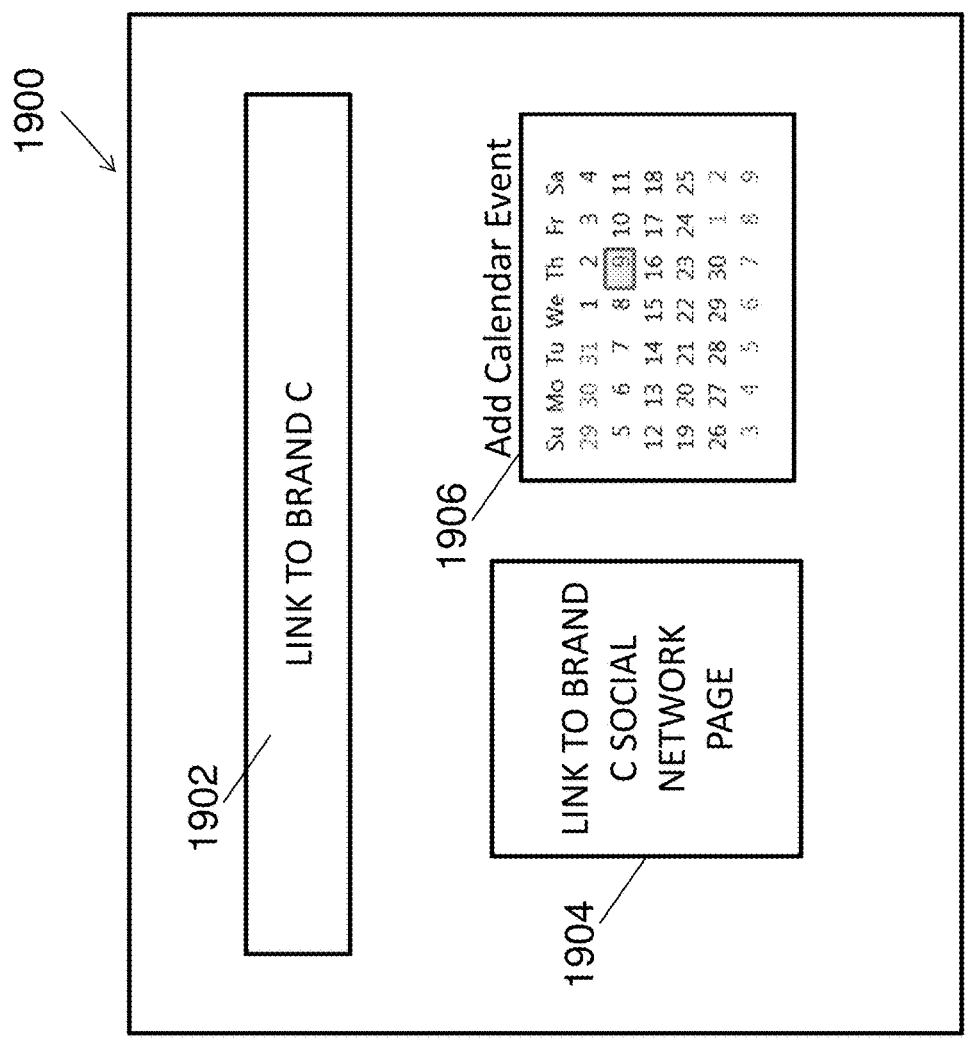
FIG. 19 is a block diagram illustrating elements included in a user interface for providing custom functionality in connection with adding calendar events.

FIG. 19 is a block diagram illustrating elements included in a user interface 1900 for providing custom functionality in connection with adding events, such as in connection with a brand's social network site, to a calendar. For example, a brand (Brand C) may offer a limited time sale, special offer, social event or other point of interest to a user. Such information can be accessible to data processing apparatus 102 and usable to generate and transmit an alert to an external data platform that includes one or more modules operable to provide user interface 1600. In response to receiving the alert, icon 1606A associated with the event can be provided and formatted as a selectable link for the user. In response to a selection of icon 1606A, user interface 1900 can be provided that includes, for example and as illustrated in FIG. 19, an icon 1902 that is formatted as a hyperlink to a website associated with Brand C, an icon 1904 that is formatted as a hyperlink to a social network page associated with Brand C. Moreover, icon 1906 can be provided that is formatted as a calendar and includes a selectable connection to a user's online or other electronic calendar for adding the event thereto, such as to set a reminder.

Figure 20:
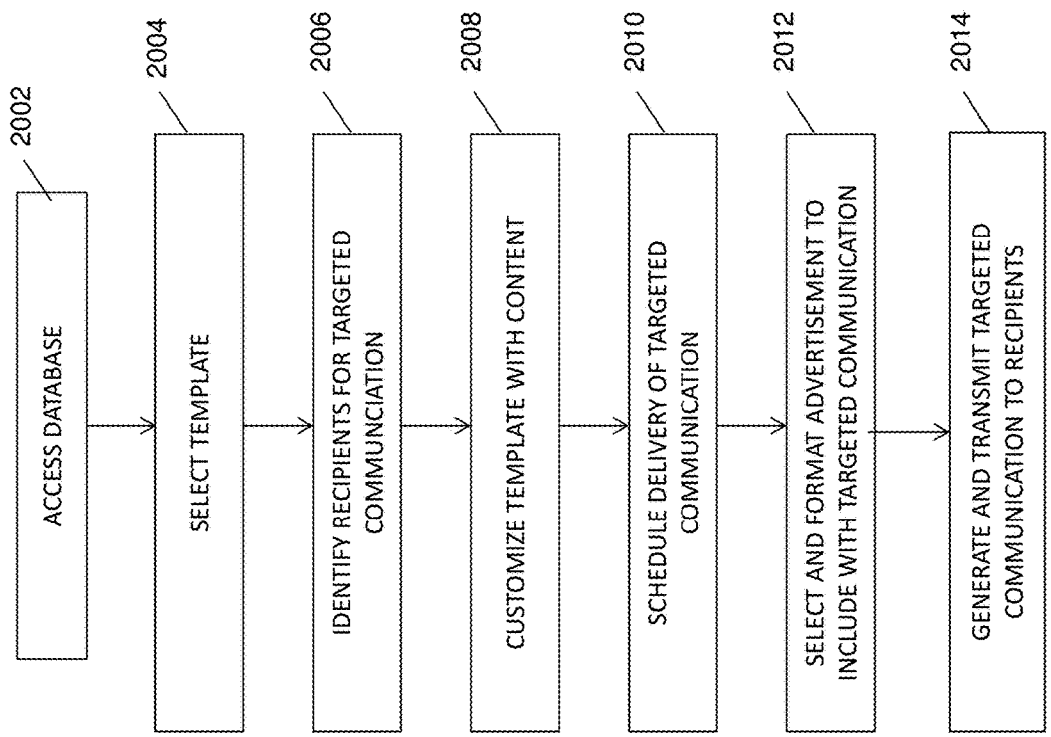
FIG. 20 is a flowchart illustrating example process steps in accordance with an example implementation of the present application.

FIG. 20 is a flowchart illustrating steps that can be performed by data processing apparatus 102, associated with generating and transmitting a targeted communication (e.g., an email message, a newsletter an alert or other content) to a plurality of recipients in accordance with an example implementation. At step 1402, a database that comprises, for example, information associated with users 304, customers 306, templates and advertising information. In response, for example, to instructions via templates module 508, a selection of a template is made (step 1404). In addition and in response to input from a user 304 via template module 508, recipients of the targeted communication are identified (step 1406). Moreover, the template is customized, for example, as a function of information received from user 304 (e.g., via content feed module 510) for each of the respective users (step 1408). In addition, the targeted communication is scheduled for delivery, such as via scheduling module 512 (step 1410). Advertising content is selected and formatted, such as a function of advertisement format module, for inclusion with the targeted communication (step 1412). In one or more implementations, the advertising content is selected and formatted as a function of geo-location information associated with at least one of the recipients. Thereafter, the targeted communication is generated and transmitted to the recipients (step 1414).

Unlike prior art methods associated with volume-based email pricing, present application provides an alternative model that includes identifying users and associating one or more data points thereto. Information such as 1) that the user has been communicated with, 2) data has been provided by the user and, 3) user-tracking based on the teachings herein is provided, thereby enabling it to flow to data processing apparatus 102, and subsequently used to send messages, take action, or other suitable action is provided. Options and features of users under management include automated lifecycle, cadence sensitivity that are associated with a given set of users, a set of products/services, and a set of business objectives. In one or more embodiments, a marketing strategy is turned over to machine-based algorithm based on human decisions. For example, a dial or throttle implementation for identifying one or more goods or services to advertise in connection with a campaign. For instance, a company that sells umbrellas turns the throttle down in areas having little rain, or where clients have already been sent advertisements associated with umbrellas. Alternatively, the throttle gets raised in areas known to have significant rain, such as Seattle. Users under management regards a particular management of data including options to exclude contact or transmissions of data or, the contrary, increasing contact and transmissions depending upon a particular context. Moreover, pricing schemes are construed depending upon the number of users under management. For example, a user who was otherwise disengaged may get engaged as a function of effective campaigns. Moreover, pricing of articles for sale may be improved, as well as pricing of one or more email campaigns in accordance with the present application. The present application focuses on improving incentives by providing quality email, rather than a strictly volume-based mail campaign.

Off-line activity is useful to define behavior profiles and useful for the present application. For example, point-of-sale information may be integrated with customer 306 behavior that is collected and managed in accordance with the teachings herein. Point-of-sale information may be provided via computing devices located at a brick-and-mortar store, or may via e-commerce web site transactions. By integrating information collected and referenced outside of data processing apparatus with information collected and managed in accordance with the teachings herein, customer 306 engagement can be significantly improved. For example, a person purchases a new type of tennis racket and information associated with the purchase may be integrated with customer 306 information managed via data processing apparatus 102. Thereafter, user 304 may implement an email ad directed tennis equipment or services, and include a customer list that includes the respective customer 306 who recently purchased the tennis racket. The likelihood of the respective customer 306 being receptive or otherwise interacting with the email is increased as a function of the off-line activity. In this way, the present application provides improved customer engagement.

Moreover, and as shown and described herein in connection with one or more implementations, modules are provided and integrated with various data platforms for engaging users with one or more brands in various ways. For example, a web-based inbox can include preference management allowing a user with quick access to control the frequency and content delivered to the user by email. Other functionality can include dynamically providing information associated with abandoned e-commerce shopping carts, adding events directly to a user's calendar, quick links to account details, and access to mobile apps. Moreover, prompts for such functionality can be provided in context, as a function of information accessible to data processing apparatus 102 in accordance with the teachings herein. The present application provides for a level of integration to allow users a rich experience from a native application that would otherwise be unable to provide.

Although the present invention has been described in relation to particular embodiments thereof, many other variations and modifications and other uses will become apparent to those skilled in the art. For example, although many of the descriptions and examples set forth herein relate to still images, the application is not so limited. It is preferred, therefore, that the present invention not be limited by the specific disclosure herein.

What is claimed is:

1. A system for providing targeted communications to each of a plurality of respective customers, and using information associated with the customers' interactions with the targeted communications in an external webmail system that is configured as a browser-based e-mail platform and used by the customers to access their email via web browser software operating on each respective customers' computing device, the system comprising:
   at least one database, stored on non-transitory processor readable media and that is accessible to at least one processor, the at least one database includes:
      electronic user information associated with a plurality of registered users;
      electronic customer information associated with each of a plurality of respective customers of at least one of the registered users;
      electronic template information representing a plurality of templates that are useable for generating targeted email communications;
      electronic content feed information representing information to be dynamically provided with the targeted email communications; and
      electronic user profile information representing at least purchase history and purchase intent for each of the plurality of respective customers of the at least one of the registered users;
   a template module that configures the at least one processor to:
      process at least one template instruction received from a computing device operated by a registered user to select one of the plurality of the templates for generating the targeted email communications;
      identify the plurality of respective customers;
      generate the targeted email communications based on the selected one of the plurality of templates;
      respectively customize the targeted email communications with at least some of the content feed respectively selected for each of the respective customers; and
      access, in response to one of the respective customers interacting with one of the targeted email communications, at least some of the electronic user profile information associated with the one of the customers, wherein the at least some of the electronic user profile information further represents at least opening the one of the targeted communications, selecting a hyperlink in the one of the targeted communications, visiting a web page associated with the hyperlink and instigating an ecommerce transaction in the web page without completing the transaction;
   at least one module provided by the at least one processor that extends the external email platform by interfacing with the external email platform and providing at least one user interface for operability in connection with the external email platform, wherein the at least one user interface includes at least one image from the web page associated with the hyperlink and includes selectable options for receiving input associated with completing a purchase of at least one item in an abandoned e-commerce shopping cart associated with the transaction.

2. The system of claim 1, wherein the at least one processor updates the at least one user interface in accordance with the input.

3. The system of claim 1, wherein the at least one user interface includes selectable options for receiving input associated with one or more of:
   downloading an app;
   adding a calendar event; and
   setting preferences associated with receiving email.

4. The system of claim 3, wherein the external email platform further configures the at least one processor to receive information associated with a selection of at least one of the selectable options.

5. The system of claim 1, wherein the external email platform module further configures the at least one processor to provide information associated with the at least some of the electronic user profile in the form of metadata and to generate an alert associated with the metadata.

6. The system of claim 5, wherein the alert is usable by the generate content in the at least one user interface.

7. The system of claim 1, wherein the electronic customer information further includes preferences of at least some of the respective customers, and further comprising:
   an alert module that configures the at least one processor to process at least one alert instruction, received from the computing device operated by the registered user, to generate and send a notification in accordance with at least one of the preferences.

8. The system of claim 7, wherein the preferences relate to at least one of a price, product availability, and topic, and wherein the notification is a product sale offer or an article containing specific content.

9. A method for providing targeted communications to each of a plurality of respective customers, and using information associated with the customers' interactions with the targeted communications in an external webmail system that is configured as a browser-based e-mail platform and used by the customers to access their email via web browser software operating on each respective customers' computing device, the method comprising:
   accessing, by at least one processor, at least one database stored on non-transitory processor readable media, the at least one database includes:
      electronic user information associated with a plurality of registered users;
      electronic customer information associated with each of a plurality of respective customers of at least one of the registered users;
      electronic template information representing a plurality of templates that are useable for generating targeted email communications;
      electronic content feed information representing information to be dynamically provided with the targeted email communications; and electronic user profile information representing at least purchase history and purchase intent for each of the plurality of respective customers of the at least one of the registered users;

processing, by the at least one processor, at least one template instruction received from a computing device operated by a registered user, wherein the at least one template instruction configures the at least one processor to:

select one of the plurality of the templates for generating the targeted email communications;

to identify the plurality of respective customers; generate the targeted email communications based on the selected one of the plurality of templates;

respectively customize the targeted email communications with at least some of the content feed respectively selected for each of the respective customers; and accessing, by the at least one processor in response to one of the respective customers interacting with one of the targeted email communications, at least some of the electronic user profile information associated with the one of the customers, wherein the at least some of the electronic user profile information further represents at least opening the one of the targeted communications, selecting a hyperlink in the one of the targeted communications, visiting a web page associated with the hyperlink and instigating an ecommerce transaction in the web page without completing the transaction;

extending the external webmail system by providing, by the at least one processor, at least one module that interfaces with the external webmail system and adds a user interface that is operable in connection with the external email platform, wherein the at least one user interface, when integrated within the external email platform, includes at least one image from the web page associated with the hyperlink and includes selectable options for receiving input associated with completing a purchase of at least one item in an abandoned e-commerce shopping cart associated with the transaction.

10. The method of claim 9, further comprising:
updating the at least one user interface in accordance with the information associated with the input.

11. The method of claim 9, wherein the at least one user interface includes selectable options for receiving input associated with one or more of:
downloading an app;
adding a calendar event; and
setting preferences associated with receiving email.

12. The method of claim 11, further comprising receiving, by the at least one processor, information associated with a selection of at least one of the selectable options.

13. The method of claim 9, further comprising providing, by the at least one processor, information associated with the at least some of the electronic user profile in the form of metadata and to generate an alert associated with the metadata.

14. The method of claim 13, wherein the alert is usable by the generate content in the at least one user interface.

15. The method of claim 9, wherein the electronic customer information further includes preferences of at least some of the respective customers, and further comprising:
processing, by the at least one processor, at least one alert instruction, received from the computing device operated by the registered user, to generate and sending, by the at least one processor, a notification in accordance with at least one of the preferences.

* * * * *